United States Patent [19]
Reed et al.

[11] Patent Number: 5,647,950
[45] Date of Patent: Jul. 15, 1997

[54] FILTER ASSEMBLY WITH A SPIN WELDED END CAP

[75] Inventors: Clayton L. Reed; John E. Ryan, Jr., both of Cortland; Bruce R. Germain, Locke, all of N.Y.

[73] Assignee: Pall Corporation, East Hills, N.Y.

[21] Appl. No.: 401,257

[22] Filed: Mar. 9, 1995

Related U.S. Application Data

[62] Division of Ser. No. 197,566, Feb. 17, 1994, abandoned, which is a continuation of Ser. No. 723,258, Jun. 28, 1991, abandoned.

[51] Int. Cl.⁶ .................................................. B29C 65/06
[52] U.S. Cl. .......................... 156/580; 156/69; 156/73.5
[58] Field of Search .......................... 156/69, 73.5, 294, 156/580, 580.2; 228/114.5, 2.3; 264/68

[56] References Cited

U.S. PATENT DOCUMENTS

| | | | |
|---|---|---|---|
| Re. 31,912 | 6/1985 | Fortuna et al. | 156/494 |
| 210,455 | 10/1878 | Latta | 431/268 |
| 360,441 | 4/1887 | Howes | 210/304 |
| 629,377 | 7/1899 | Leland | 210/441 |
| 1,175,948 | 3/1916 | French | 210/304 |
| 1,669,461 | 5/1928 | Gamble | 55/509 |
| 2,145,535 | 1/1939 | Vokes | 210/131 |
| 2,395,449 | 2/1946 | Briggs | 210/489 |
| 2,420,414 | 5/1947 | Briggs | 210/493.1 X |
| 2,537,992 | 1/1951 | Gross et al. | 55/498 |
| 2,586,078 | 2/1952 | O'Malley | 206/397 |
| 2,600,150 | 6/1952 | Abendroth | 166/228 |
| 2,689,652 | 9/1954 | Gretzinger | 210/457 |

(List continued on next page.)

FOREIGN PATENT DOCUMENTS

| | | |
|---|---|---|
| 824484 | 10/1969 | Canada . |
| 92305748 | 6/1992 | European Pat. Off. . |
| 520737A1 | 12/1992 | European Pat. Off. . |
| 605018A2 | 12/1993 | European Pat. Off. . |
| 2800425 | 12/1979 | Germany . |
| 2940144A1 | 4/1981 | Germany . |
| 3429634A1 | 2/1986 | Germany . |
| 3606993A1 | 9/1987 | Germany . |
| 3837423 | 10/1990 | Germany . |
| 45-30398 | of 1970 | Japan . |
| 53-5075 | of 1978 | Japan . |
| 61-61012 | 4/1986 | Japan . |
| 61-227809 | 10/1986 | Japan . |
| 62-273008 | of 1987 | Japan . |
| 63-65908 | of 1988 | Japan . |
| 1171607 | 7/1989 | Japan . |
| 4122614 | 11/1992 | Japan . |
| 5345357 | of 1993 | Japan . |
| 841818 | 7/1960 | United Kingdom . |
| 1003164 | 9/1965 | United Kingdom . |
| 1201156 | 8/1970 | United Kingdom . |
| 1400147 | 7/1975 | United Kingdom . |
| 2230472 | 4/1990 | United Kingdom . |
| 8404050 | 10/1984 | WIPO . |
| 9421362 | 3/1994 | WIPO . |
| 9510346 | 4/1995 | WIPO . |

OTHER PUBLICATIONS

Co-pending U.S. Patent Application Serial No. 08/197,566.

*Primary Examiner*—James Sells
*Attorney, Agent, or Firm*—Leydig, Voit & Mayer

[57] ABSTRACT

The filter assembly includes a filter element having an end surface and an end cap connected to the end surface by spin welding. The end cap has an outer diameter that need be no larger than the outer diameter of the end surface of the filter element. Prior to spin welding, the end cap may have a surface with a sacrificial ridge extending from the surface. The end cap is spin welded to the end surface of the filter element by rotating the filter element and the end cap with respect to one another while contacting the sacrificial ridge with the end surface of the filter element, melting the sacrificial ridge by the contact with the filter element to form a molten plastic, and joining the surface of the end cap to the end surface of the filter element with the molten plastic. Also disclosed is a method of spin welding a filter pack to an end cap without a sacrificial ridge.

64 Claims, 13 Drawing Sheets

U.S. PATENT DOCUMENTS

| | | | |
|---|---|---|---|
| 2,759,610 | 8/1956 | James | 210/493.1 |
| 2,801,009 | 7/1957 | Bowers | 210/493.4 |
| 2,979,209 | 4/1961 | Nolden | 210/435 |
| 3,002,870 | 10/1961 | Belgarde et al. | 156/70 |
| 3,054,507 | 9/1962 | Humbert, Jr. et al. | 210/493.1 |
| 3,122,501 | 2/1964 | Hultgren | 210/94 |
| 3,174,625 | 3/1965 | Briggs | 210/493.1 |
| 3,241,680 | 3/1966 | Humbert, Jr. | 210/457 |
| 3,244,574 | 4/1966 | Decker et al. | 156/73.5 |
| 3,314,546 | 4/1967 | Briggs et al. | 210/457 |
| 3,389,797 | 6/1968 | Giardini | 210/138 |
| 3,392,843 | 7/1968 | Mumby | 210/457 |
| 3,438,825 | 4/1969 | Fidler | 210/493.1 |
| 3,499,068 | 3/1970 | Brown | 156/73.5 |
| 3,501,013 | 3/1970 | Madsen | 210/497.01 |
| 3,503,511 | 3/1970 | Spitzberg | 210/232 |
| 3,547,719 | 12/1970 | Kasten | 156/69 |
| 3,696,932 | 10/1972 | Rosenberg | 210/437 |
| 3,719,983 | 3/1973 | Funk et al. | 156/73.5 |
| 3,769,128 | 10/1973 | Manjikian | 156/185 |
| 3,813,334 | 5/1974 | Bray | 210/321.83 |
| 3,850,813 | 11/1974 | Pall et al. | 210/232 |
| 3,902,858 | 9/1975 | Chernykh | 422/205 |
| 3,920,553 | 11/1975 | Ciento | 210/232 |
| 3,932,153 | 1/1976 | Byrns | 55/511 |
| 3,982,980 | 9/1976 | van Manen | 156/73.5 |
| 4,062,781 | 12/1977 | Strauss et al. | 210/446 |
| 4,069,091 | 1/1978 | van Manen | 156/498 |
| 4,148,732 | 4/1979 | Burrow et al. | 210/232 |
| 4,206,050 | 6/1980 | Walch et al. | 210/23 R |
| 4,218,324 | 8/1980 | Hartmann et al. | 210/493 R |
| 4,353,761 | 10/1982 | Woerz et al. | 156/69 |
| 4,386,999 | 6/1983 | Fortuna et al. | 156/494 |
| 4,402,830 | 9/1983 | Pall | 210/457 |
| 4,457,795 | 7/1984 | Mason et al. | 156/73.5 |
| 4,500,426 | 2/1985 | Ishii et al. | 210/321.3 |
| 4,517,090 | 5/1985 | Kersten et al. | 210/493.2 |
| 4,522,719 | 6/1985 | Kuwajima et al. | 210/457 |
| 4,552,612 | 11/1985 | Fortuna et al. | 156/494 |
| 4,721,546 | 1/1988 | Clark et al. | 156/567 |
| 4,741,788 | 5/1988 | Clark et al. | 156/64 |
| 4,743,331 | 5/1988 | Nuttall et al. | 156/358 |
| 4,758,392 | 7/1988 | Collins et al. | 264/68 |
| 4,784,709 | 11/1988 | Unger et al. | 156/69 |
| 4,839,037 | 6/1989 | Bertelsen et al. | 210/97 |
| 4,855,058 | 8/1989 | Holland et al. | 210/652 |
| 4,872,990 | 10/1989 | Van Wijk | 210/644 |
| 4,929,354 | 5/1990 | Meyering et al. | 210/321.61 |
| 4,956,089 | 9/1990 | Hurst | 210/484 |
| 4,963,260 | 10/1990 | Naoi et al. | 210/446 |
| 5,064,385 | 11/1991 | Smith et al. | 156/69 |
| 5,096,591 | 3/1992 | Benn et al. | 210/651 |
| 5,128,039 | 7/1992 | Gabrielson | 210/450 |
| 5,130,023 | 7/1992 | Feint | 210/493.2 |
| 5,147,541 | 9/1992 | McDermott, Jr. et al. | 210/321.74 |
| 5,174,896 | 12/1992 | Harms, II | 210/455 |
| 5,252,207 | 10/1993 | Miller et al. | 210/335 |
| 5,275,743 | 1/1994 | Miller et al. | 210/767 |
| 5,277,807 | 1/1994 | Lavoie et al. | 210/321.74 |
| 5,290,445 | 3/1994 | Buttery | 210/445 |
| 5,403,482 | 4/1995 | Steere et al. | 210/489 |

FILTER ASSEMBLY WITH A SPIN WELDED END CAP

This application is a divisional of application Ser. No. 08/197,566, filed Feb. 17, 1994, now abandoned, which is a continuation of prior application Ser. No. 07/723,258, filed on Jun. 28, 1991, now abandoned.

TECHNICAL FIELD

This invention relates to a filter assembly having at least one end cap attached to a filter element by spin welding.

BACKGROUND OF THE INVENTION

A typical filter assembly comprises a filter element and end caps secured to opposite ends of the filter element. There are various methods for attaching the end caps to the filter element, such as bonding, injection molding, and thermal welding. For example, in bonding, an adhesive or a solvent is applied to the end cap and/or the end surface of the filter element, and the filter element is pressed against the end cap until the joint is set. However, it is difficult to achieve a leak-proof seal by this method. There have been a number of proposals of forming an end cap by injection molding the end cap directly onto the end of a filter element, but such methods are slow, and the filter element must be very dense to prevent the injection pressure from driving molten plastic into the filter element and reducing the usable surface of the filter element. In thermal welding, a thermoplastic end cap is heated to liquefy one surface of the end cap and form a molten plastic. One end of a filter element is then placed against the liquefied surface of the end cap. When the plastic solidifies, the filter element is securely joined to the end cap. However, during the welding process, an undesirably large amount of molten plastic may be drawn into the filter element by capillary action, thereby degrading the properties of the end portion of the filter element.

It has also been proposed to connect end caps to filter elements by spin welding. In spin welding, two members to be joined are placed in frictional contact with one another, and then one of the members is rotated with respect to the other member to generate heat by frictional contact. The heat melts the surface of one or both of the members to form a molten material at the interface of the two members. When the rotation is stopped, the molten material solidifies to securely bond the two members to one another. Usually, one of the two members to be joined by spin welding is made of a thermoplastic resin.

Canadian Patent No. 824,484 describes one particular spin welding method for attaching an end cap to a filter element in which a cup-shaped end cap having inner and outer annular flanges is spin welded to the end of a filter element with a corrugated filter pack. However, when a cup-shaped end cap such as that described in Canadian Patent No. 824,484 is rotated with respect to a filter element, if the end cap and the filter element are not perfectly coaxial, or if there is any interference between the surfaces of the flanges and the peripheral surfaces of the filter element, the flanges of the end cap and the peripheral surfaces of the filter element may heat up before the end surfaces of the end cap or the filter element. This produces flash, i.e., an extraneous molten material, which extends over the flanges of the end cap. The flash is not only unsightly but can also damage the filter element. Furthermore, the rotating flanges of a cup-shaped end cap can damage the peripheral surfaces of a corrugated filter pack, causing the filter to leak and lose its efficiency. Therefore, for many types of filter elements, it is impractical to attach cup-shaped end caps by means of spin welding.

In addition, because conventional spin welding methods such as that described in Canadian Patent No. 824,484 use a cup-shaped end cap, the maximum dimensions of the completed filter assembly are determined by the outer diameter of the end cap, which is larger than the diameter of the filter element. When the filter assembly is installed in a housing, the housing must be at least as large in diameter as the end caps, and in most cases, this results in the housing being larger than is required by fluid flow area considerations. Furthermore, when a plurality of filter assemblies are disposed in a single housing, the number of filter assemblies that can fit into the housing is unduly limited by such unnecessarily large diameter end caps.

SUMMARY OF THE INVENTION

Accordingly, it is an object of the present invention to provide an improved filter assembly having an end cap joined to a filter element of the filter assembly by spin welding.

It is another object of the present invention to provide a filter assembly with a spin welded end cap having an outer diameter which is no larger than the outer diameter of the filter element of the filter assembly.

It is yet another object of the present invention to provide an improved housing which has a minimal hold-up volume.

It is a further object of the present invention to provide an improved method and system for spin welding an end cap to a filter element.

It is another object of the present invention to provide an improved end cap suitable for spin welding to a filter element.

A filter assembly according to the present invention comprises a filter element having an end surface and an end cap connected to the end surface by spin welding. The end cap has an outer diameter that need be no larger than the outer diameter of the end surface of the filter element.

In one embodiment, the filter element of the filter assembly comprises a filter pack having a filter medium for filtering a desired fluid. The filter element may also include other members such as a perforated core or a protective cage. The filter element is cylindrical with two end surfaces. The end cap of the filter assembly has a surface with a sacrificial ridge extending from the surface. The end cap is spin welded to an end surface of the filter element by rotating the filter element and the end cap with respect to one another while contacting the sacrificial ridge with the core of the filter element. The sacrificial ridge is melted by frictional contact with the core to form a molten plastic which coats the interface of the end cap and the filter element. When the molten plastic solidifies, it rigidly connects the end cap to the end surface of the filter element.

A filter housing according to the present invention comprises a cylindrical body having projections which project inward from the inner surface of the body of the housing for supporting a filter element against reverse pressures tending to expand the filter element. The projections support the outer peripheral surface of the filter element and make a cage unnecessary.

DESCRIPTION OF PREFERRED EMBODIMENTS

A number of preferred embodiments of the present invention will now be described while referring to the accompanying drawings, FIG. 1 of which is a longitudinal cross-sectional view of a first embodiment of a filter assembly with two spin-welded end caps. The filter assembly has a cylindrical filter element 10 having two end surfaces to which end caps 20 are attached by spin welding. The filter element 10 includes a cylindrical filter pack 11 having a filter media for performing filtration. The filter pack 11 can be either corrugated or non-corrugated, depending upon the substance to be filtered, and it can be made of any filter material to which the molten plastic formed during spin welding will adhere so as to form a liquid-tight connection between the filter pack 11 and the end cap 20. Filter packs made of thermoplastic materials are particularly suitable for spin welding, but non-thermoplastic materials can also be employed for welding to thermoplastic end caps. Some examples of suitable thermoplastic materials are polypropylene, nylon, polyester, while examples of suitable non-thermoplastic materials are cellulose and fiber glass. The filter pack 11 need not be made of only a single material and can have a plurality of layers or fibers made of different materials.

Figure 1:
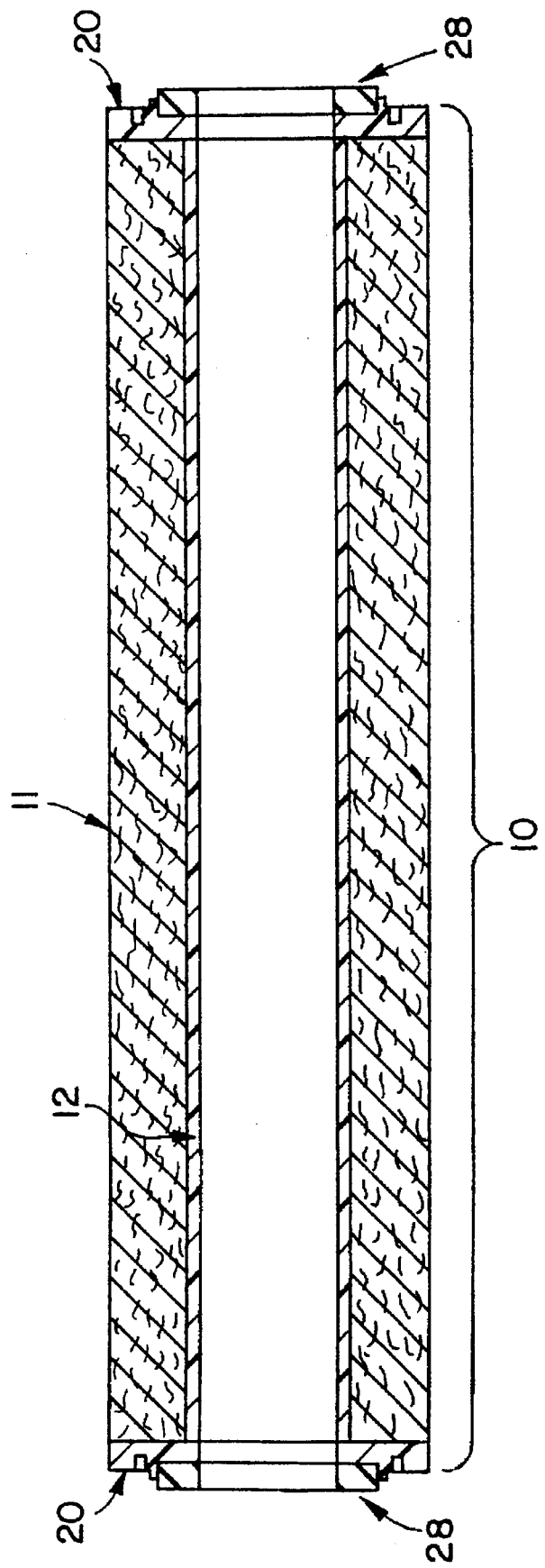
FIG. 1 is a longitudinal cross-sectional view of an embodiment of a filter assembly according to the present invention.

The filter element 10 of FIG. 1 is equipped with a cylindrical perforated core 12 coaxially disposed inside the filter pack 11. A core 12 is not an essential element of the present invention, but in many applications, a core 12 is desirable to give the filter element 10 strength and rigidity, particularly when the filter pack 11 is corrugated. It is possible for the core 12 to be shorter than the filter pack 11 or to comprise a plurality of coaxial, discontinuous rings, but typically the core 12 will extend continuously for the entire length of the filter element 10, as shown in FIG. 1. The core 12 is preferably made of a thermoplastic material which will partially melt during spin welding and become joined to the end caps 20. Polypropylene is particularly suitable as a material for the core 12 because it has a low melting point so it can be easily melted during spin welding. However, any material, thermoplastic or otherwise, which is compatible with the fluid being filtered can be used for the core 12.

Each of the end caps 20 of this embodiment is an annular member with an outer periphery that is substantially flush with the outer periphery of the filter element 10 and an inner periphery which is substantially flush with the inner periphery of the filter pack 11 or core 12. While it is possible for the outer peripheries of the end caps 20 to extend beyond the outer periphery of the filter element 10, one of the advantages of the present invention is that it is not necessary for the end caps 20 to have outer peripheral flanges which extend over the ends of the filter element 10, so the outer diameter of the filter assembly as a whole need be no larger than the outer diameter of the filter element 10. The outer diameter of the end cap 20 may even be less than the nominal outer diameter of the filter element 10.

The spin welded end caps 20 of a filter assembly according to the present invention can be either blind end caps or open end caps, and end caps of two different types can be attached to opposite ends of a single filter element. Preferably both end caps are attached by spin welding, but it is also possible for one of the end caps to be attached by a different method.

Figure 2A:
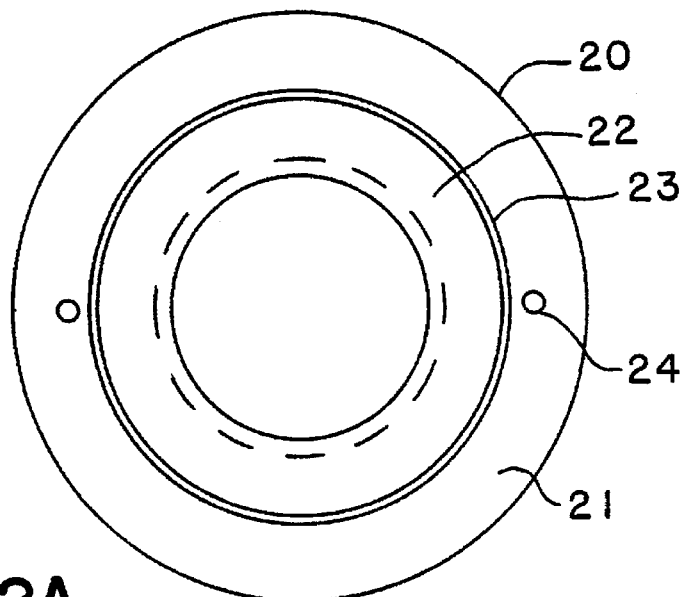
FIG. 2A is a plan view and FIG. 2B is a cross-sectional view of one of the end caps of the filter assembly of FIG. 1.
Figure 2B:
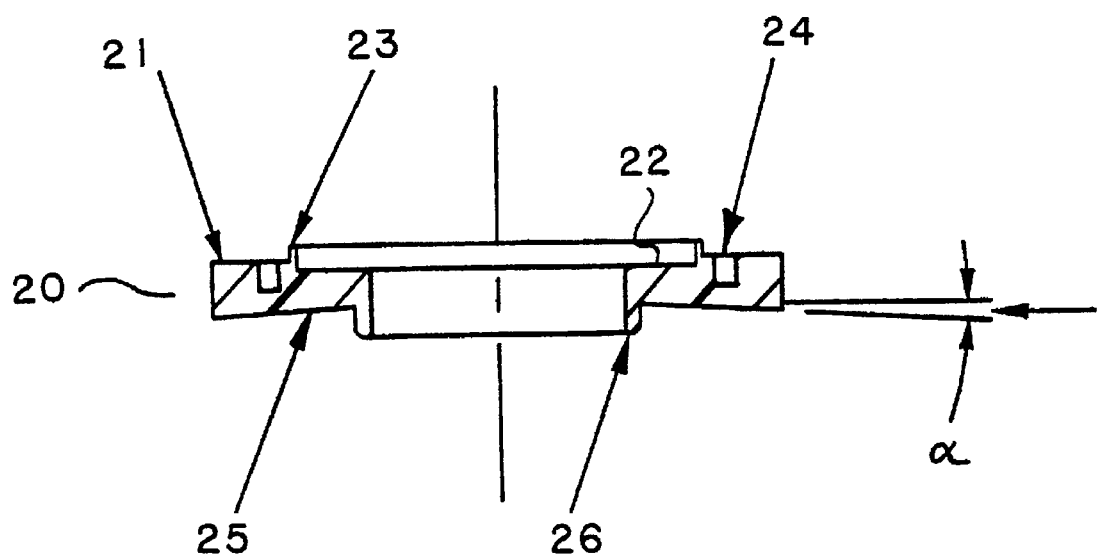

FIGS. 2A and 2B are respectively a plan view and a transverse cross-sectional view of one of the end caps 20 of FIG. 1 prior to being spin welded to the end of a filter element 10. The end cap 20 has a central cavity through which fluid can pass, a top surface 21, and a bottom surface 25 which is connected to a filter element 10 by spin welding. The diameter of the central cavity can be either larger or smaller than the diameter of the central cavity of the filter element 10 to which the end cap 20 is to be attached but is preferably smaller than the inner diameter of the filter pack 11. In the present embodiment it has the same inner diameter as the core 12 of the filter element 10 so that the end cap 20 will not obstruct fluid flow through the ends of the filter element 10.

In the embodiment of FIGS. 1, 2A, and 2B, an annular sacrificial ridge 26 projects from the bottom surface 25 of the end cap 20 prior to spin welding. The inner periphery of the sacrificial ridge 26 is preferably flush with the periphery of the central cavity of the end cap 20, and the sacrificial ridge 26 preferably extends continuously for a full 360 degrees around the end cap 20. During spin welding, the sacrificial ridge 26 is melted by frictional contact with the core 12 of the filter element 10 and forms molten plastic which coats the bottom surface 25 of the end cap 20 and the end surface of the filter element 10 to which the end cap 20 is to be joined. The height and wall thickness of the sacrificial ridge 26 are preferably chosen to provide enough molten plastic to form a thin layer between the end cap 20 and the filter element 10 without generating a large amount of flash. If the core 12 of the filter element 10 is made of a material which does not melt during spin welding, the sacrificial ridge 26 can be totally consumed during spin welding. When the core 12 is made of a thermoplastic material which melts during spin welding, the end of the core 12 and the sacrificial ridge 26 can both be partially consumed and fuse together. In either case, at the completion of spin welding, the height of the sacrificial ridge 26 has decreased to the point where there is no gap between the bottom surface 25 of the end cap 20 and the end surface of the filter element 10.

When the filter element 10 to which the end cap 20 is to be connected has a core 12, the diameter of the sacrificial ridge 26 is preferably substantially the same as the diameter of the core 12. Consequently, during spin welding the sacrificial ridge 26 will be in frictional contact initially with the core 12 rather than with the filter pack 11, thereby minimizing abrasion of the filter pack 11. Of course, once the sacrificial ridge 26 is sufficiently consumed, the surfaces of the end cap 20 and the filter pack 11 may contact one another and some melting of the filter pack 11 or the end cap 20 may occur.

Although the illustrated embodiment includes a sacrificial ridge 26 which may be at least partially consumed during spin welding, the ridge 26 is not an essential feature of the present invention. For example, when the filter element 10 does not include a core 12 or when the thermoplastic material has a low melting point or a high coefficient of friction, the sacrificial ridge may be omitted.

The bottom surface 25 of the end cap 20 of FIG. 2B is sloped at an angle $\alpha$ with respect to a plane perpendicular to the axis of the end cap 20. A sloping bottom surface 25 is not an essential feature of the present invention, but it provides a number of benefits. During spin welding, the portions of the end cap 20 near its outer periphery are remote from the sacrificial ridge 26, which is the primary source of molten plastic. To compensate for this, it is desirable to increase the length of time for which these portions of the end cap 20 are in contact with the end surface of the filter element 10. Due to the sloping bottom surface 25, the outer peripheral portions of the end cap 20 contact the filter element 10 before the inner peripheral portions, so frictional heating takes place for a longer period of time in the outer portions. The sloping bottom surface 25 also acts as a dam or impediment, preventing the molten plastic from escaping the bond region.

The angle $\alpha$ of the sloping portion of the bottom surface 25 will depend upon the type (corrugated or non-corrugated) and material (thermoplastic or non-thermoplastic) of the filter pack 11 to which the end cap 20 is to be connected. Generally, the angle $\alpha$ can be smaller with a filter element 10 having a non-corrugated filter pack 11 than with one having a corrugated filter pack 11. With a non-corrugated filter pack, there is more material in contact with the end cap and, therefore, more heat generated in a shorter period of contact. Furthermore, the angle can be smaller when the end cap 20 is being spin welded to a filter element 10 having a filter pack 11 made of a thermoplastic material such as polyester, nylon, or polypropylene fibers than when spin welded to a filter element 10 having a filter pack 11 made of a non-thermoplastic material such as fiberglass or cellulose. With a non-thermoplastic filter pack 11, all the molten material for joining the end cap to the filter element 10 must be supplied by the end cap 20. In many instances, the angle $\alpha$ may be as large as 12 degrees or more but is preferably no greater than about 4 degrees. The angle is preferably not so large that the outer periphery of the end cap 20 contacts the filter element 10 during spin welding before the sacrificial ridge 26 contacts the core 12. In addition, the angle is preferably at least 0 degrees. If the angle is negative, the bottom surface 25 of the end cap 20 will slope away from the filter element 10, with the result that the inner periphery of the end cap 20 will be heated up more than the outer periphery and there is no impediment or dam preventing escape of the molten material.

The end cap 20 can be made of any material which can be melted by frictional contact with a filter element 10 to produce a molten material which can secure the end cap 20 to the filter element 10. The end cap material will depend on the material of which the filter pack 11 is made. Preferably, the end cap 20 is made of a thermoplastic material, some suitable examples of which are polypropylene, polyethylene, and nylon. Polypropylene is particularly suitable as an end cap material because of its low melting point, so it can be melted during spin welding without the filter element 10 being subjected to harmful temperatures. Also, because of the low melting point of polypropylene, it is not necessary to press the filter element 10 and the end cap 20 against each other with a large axial force during spin welding.

During use of the filter assembly of the present invention, a gasket 28 may be disposed on the top surface 21 of each end cap 20 which is to be connected to another member, such as a tube sheet or the end cap of another filter assembly. For this purpose, in the embodiment of FIG. 1, a gasket seat 22 is formed on the top surface 21 of each end cap 20. The gasket seat 22 is surrounded by an annular centering ridge 23 that projects from the top surface 21 and serves to center the gasket 28 on the gasket seat 22. The gasket 28 can be loosely mounted on the gasket seat 22 at the time of installation of the filter assembly, but preferably the gasket 28 is secured to the gasket seat 22 at the time of manufacture in order to simplify installation. The gasket 28 can be secured to the gasket seat 22 by any suitable means, such as by bonding, thermal welding, or an interference fit between the gasket 28 and the centering ridge 23. The gasket 28 can be made of any material which is compatible with the fluid being filtered and which effectively seals the end cap to the other member.

Spin welding of an end cap 20 is accomplished by bringing the bottom surface 25 of the end cap 20 into frictional contact with an end surface of a filter element 10 while producing relative rotation of the two members. It is possible to rotate either the filter element 10 or the end cap 20, but because of its smaller size, it is generally easier to rotate the end cap 20. In the embodiment of FIG. 1, a plurality of holes 24 are formed in the top surface 21 of each end cap 20 radially outward from the centering ridge 23. The holes 24 are sized to receive, corresponding pins of a rotating portion of a spin welding system. The pins support the end cap 20 during spin welding and transmit torque to the end cap 20. However, means other than holes 24 and corresponding pins can be used to rotate the end caps 20 during spin welding. For example, the end caps 20 can be formed with ribs, projections, or depressions which engage with corresponding portions of a spin welding system.

FIG. 3 illustrates an embodiment of a portion of a spin welding system according to the present invention which can be employed to manufacture the filter assembly illustrated in FIG. 1. An end cap 20 to be spin welded to the end of a filter element 10 is rotated by a spin head 30. The spin head 30 is rotated by an electric motor or similar device via a clutch and brake assembly. The clutch enables the spin head 30 to be disconnected from the motor when it is desired to stop the rotation of the spin head 30, and the brake applies a braking force to the spin head 30 to prevent the inertia of the spin head 30 from continuing to spin the end cap 20 after the clutch has been disengaged.

Figure 3A:
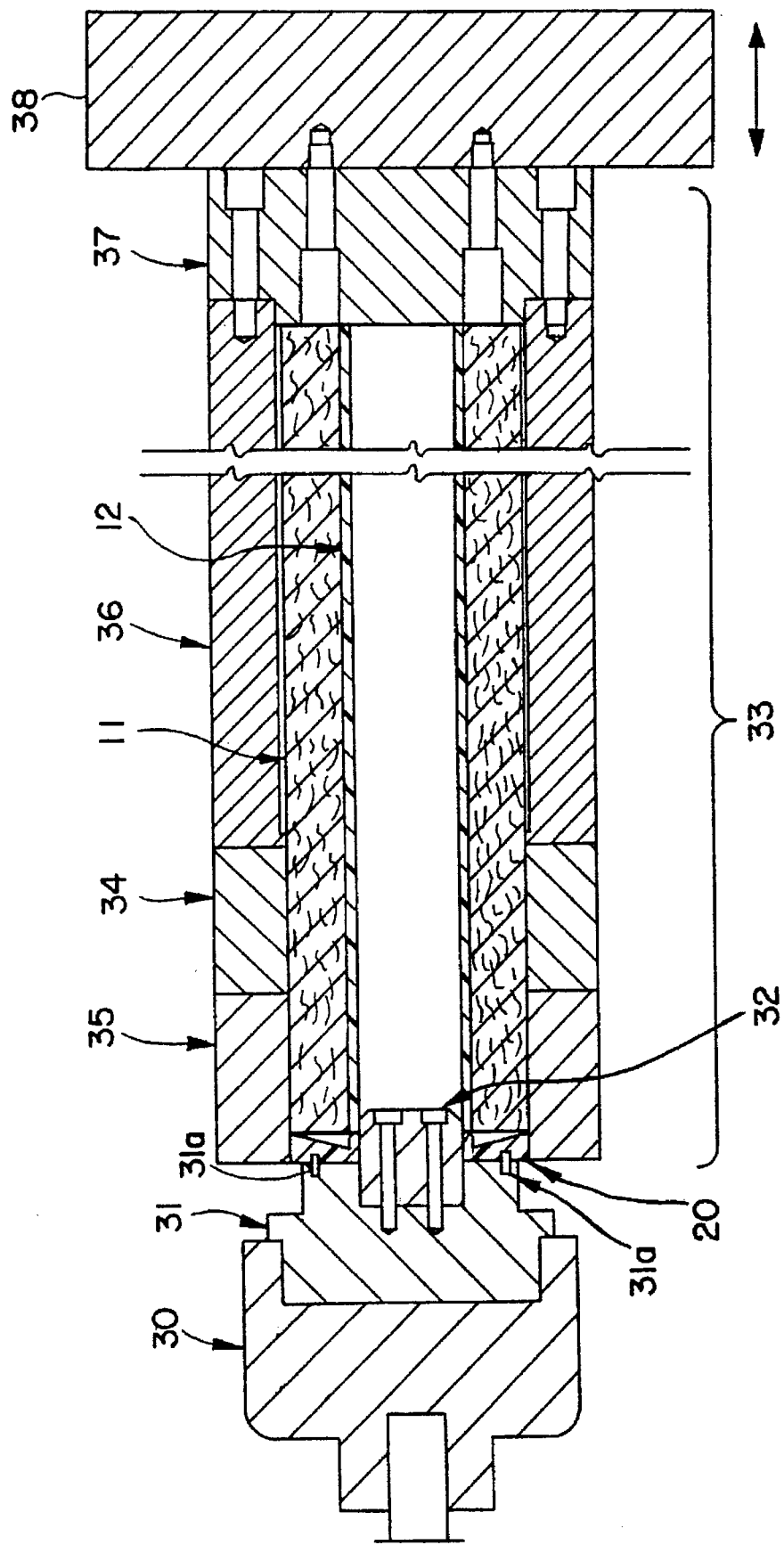
FIG. 3A is a longitudinal cross-sectional view of a portion of a spin welding system for manufacturing the filter assembly of FIG. 1.
Figure 3B:
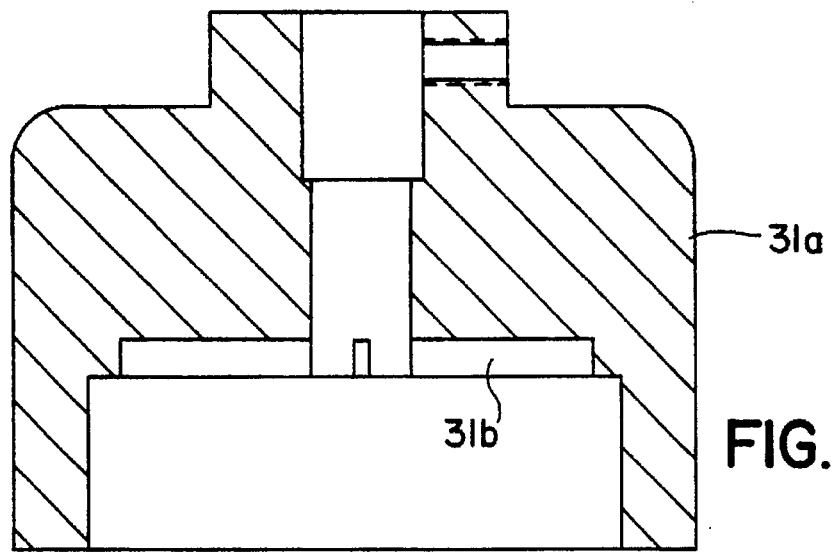
FIGS. 3B, 3C, and 3D show an alternative adapter and end cap.
Figure 3C:
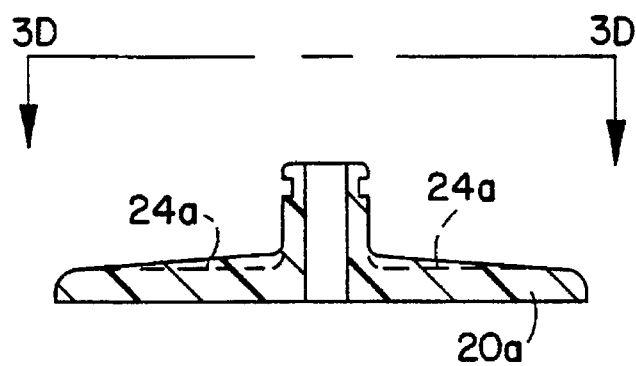
Figure 3D:
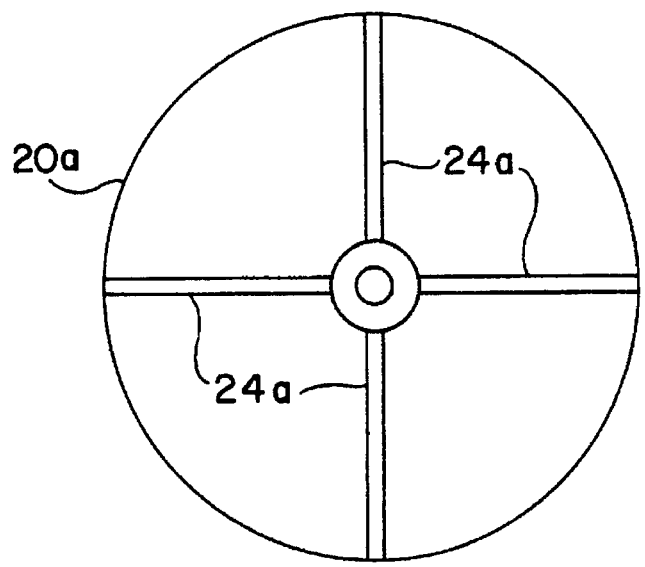
Figure 3E:
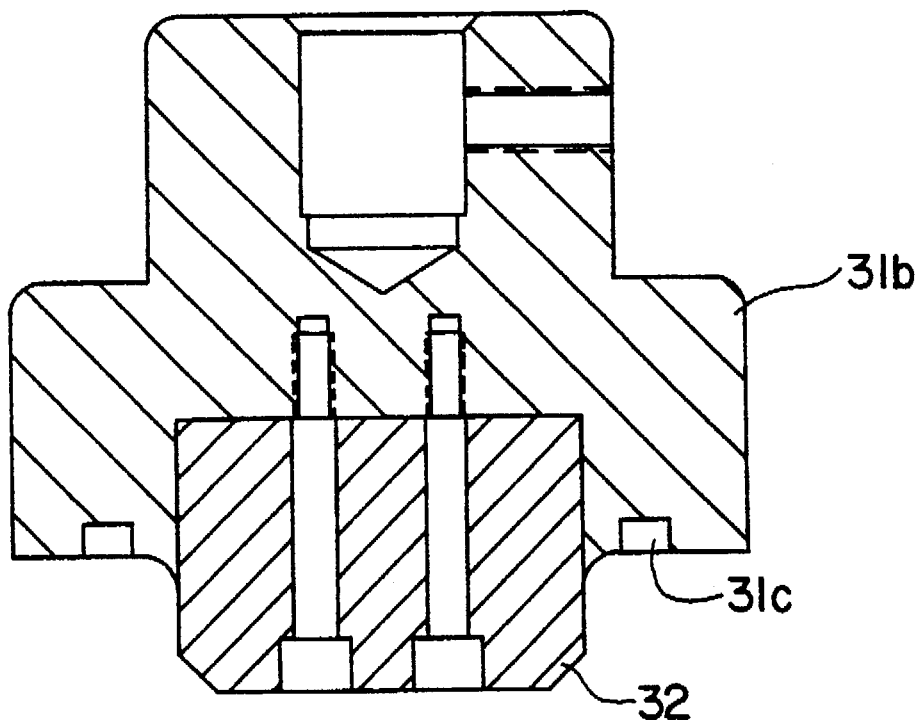
FIGS. 3E and 3F show a further alternative adapter and end cap.
Figure 3F:
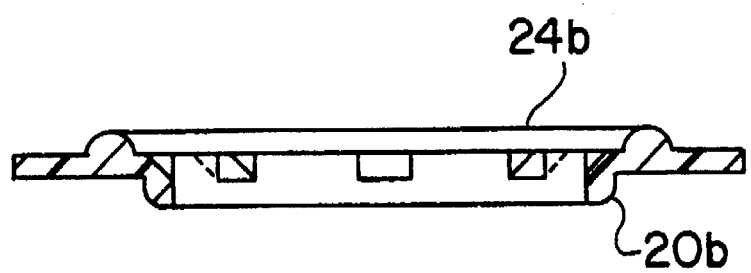

An end cap adaptor 31 for supporting an end cap 20 to be spin welded may be secured to the spin head 30. The adaptor 31 may have a plurality of pins 31a that fit into the corresponding holes 24 in the top surface 21 of the end cap 20. Although the embodiment shown in FIG. 3A uses pins 31a and holes 24 to mount the end cap 20 to the adapter 31, a variety of alternatives are available. For example, as shown in FIGS. 3B, 3C, and 3D, the adapter 31a may include radial slots 31b which engage radial ridges 24a on the end cap 20a. As shown in FIGS. 3E and 3F, the adapter 31b may include an annular slot 31c which engages an annular ridge 24b on the end cap 20b. Alternatively, the slots may be formed in the end cap while the ridges are formed on the adapter. In yet another alternative, the adapter and the end cap may engage one another simply by frictional contact.

An inner retainer 32 having a cylindrical outer periphery projects from the center of the adaptor 31. The end cap 20 is mounted on the adaptor 31 with the central cavity of the end cap 20 surrounding the inner retainer 32 and the end surface of the inner retainer 32 extending beyond the sacrificial ridge 26 of the end cap 20. The inner retainer 32 and the adaptor 31 can be a single integral member, but in the present embodiment they are formed as separate, detachable members so that the inner retainer 32 can be replaced as necessary to enable the same end cap adaptor 31 to be used with a multiplicity of end caps 20 having differing inner diameters. At least the outer surface of the inner retainer 32 is preferably made of a material which will not enter into the spin welding process. Some examples of suitable materials for the inner retainer 32 are stainless steel, aluminum, PTFE, and PFA.

During spin welding, the inner retainer 32 extends into the hollow center of the core 12 of the filter element 10 to which the end cap 20 is to be connected. The outer diameter of the inner retainer 32 is preferably slightly smaller than the inner diameter of the core 12 of the filter element 10 to prevent the inner retainer 32 from contacting the core 12. However, the clearance between the inner retainer 32 and the core 12 is preferably small enough to impede the flow of molten plastic between the two. A clearance of approximately 0.010 of an inch is generally suitable.

The filter element 10 being joined to the end cap 20 is supported by a filter element holder 33 secured to a ram 38. Although the filter element holder may be variously configured, in the illustrated embodiment the filter element holder 33 includes a filter element clamp 34, an outer retainer 35, a connecting sleeve 36, and a filter element adaptor 37 coaxially secured to one another to define a cylindrical chamber for receiving the filter element 10.

The filter element clamp 34 prevents the filter element 10 from rotating. The filter element clamp 34 has a cylindrical inner surface which surrounds a section of the filter element 10 with an interference fit between the filter element clamp 34 and the outer periphery of the filter element 10. The fit should be tight enough to restrain the filter element 10 from rotation when the end of the filter element 10 is contacted by a rotating end cap 20 without being so tight as to damage the outer surface of the filter element 10.

The outer retainer 35 adjoins the filter element clamp 34 and may have a cylindrical inner surface that surrounds and extends somewhat beyond the end of the filter element 10 to which an end cap 20 is being attached. The purpose of the outer retainer 35 is to retain flash from the end cap 20 and the filter element 10 which is generated during the spin welding. When the end cap 20 is in contact with the filter element 10, the outer periphery of the end cap 20 preferably extends at least partway into the outer retainer 35. To prevent contact between the end cap 20 and the outer retainer 35, the inner diameter of the outer retainer 35 is slightly larger than the outer diameter of the end cap 20. The inner surface of the outer retainer 35 in at least the portion surrounding the end cap 20 is preferably made of or coated with a material such as stainless steel, aluminum, PTFE, or PFA, which will not enter into the spin welding process. Since the filter element 10 is prevented from rotating by the filter element clamp 34, the inner surface of the outer retainer 35 need not be in contact with the outer surface of the filter element 10. However, any clearance between the outer retainer 35 and the filter element 10 is preferably small enough to prevent flash generated during spin welding from flowing among the filter element 10 through the clearance. Similarly, the clearance between the outer retainer 35 and the end cap 20 is preferably small enough to prevent flash from leaking to the outside of the spin welding system. A clearance of approximately 0.010 of an inch between the end cap 20 and the outer retainer 35 is generally sufficient to prevent leakage of flash.

The filter element clamp 34 and the outer retainer 35 can be a single integral member. However, since it may be desirable to make the inner surface of the filter element clamp 34 and the inner surface of the outer retainer 35 of different materials so as to give them different coefficients of friction, it may be more economical to manufacture them as separate members as in FIG. 3 and then connect them together by bolts, clamps, or other suitable means.

The connector sleeve 36 is coaxially connected at one end to the filter element clamp 34 and surrounds the remainder of the filter element 10. The other end of the connector sleeve 36 is secured to the filter element adaptor 37. The connector sleeve 36 serves primarily to transmit axial and torsional forces from the filter element adaptor 37 to the filter element clamp 34. In the embodiment of FIG. 3, the connector sleeve 36 and the filter element 10 are separated by an annular space to facilitate installation of the filter element 10. The connector sleeve 36 is shown as being a cylindrical member that surrounds the entire circumference of the filter element 10, but other means can be used to connect the filter element clamp 34 to the filter element adaptor 37, such as a plurality of rods spaced around the periphery of the filter element 10. The connector sleeve 36 and the filter element clamp 34 could also be a single member.

The filter element adaptor 37 closes off the end of the filter element holder 33 and secures the filter element holder 33 to the ram 38 by screws or the like. In the embodiment shown in FIG. 3, the filter element adaptor 37 abuts against one of the end surfaces of the filter element 10 and transmits axial movement from the ram 38 to the filter element 10 during spin welding.

The ram 38 can be moved in the direction of the double-headed arrow in FIG. 3 by a drive mechanism such as a hydraulic piston, a linear motor, or a feed screw to move the filter element holder 33 towards and away from the spin head 30. As an alternative arrangement, the ram 38 can be connected to the spin head 30 instead of to the filter element holder 33, and the filter element holder 33 can be maintained stationary while the spin head 30 is moved back and forth in the direction of the double-headed arrow.

In a preferred mode of operation, an end cap 20 is mounted on the end cap adaptor 31 of the spin head 30 and is held in place by means of pins 31a of the end cap adaptor 31. A filter element 10 is inserted into the connector sleeve 36 and bottomed against the filter element adapter 37. The filter element clamp 34 is then installed around the filter element 10 and connected to the connector sleeve 36. Finally, the outer retainer 35 is installed around the end of the filter element 10 and connected to the clamp 34.

Once the end cap 20 and the filter element 10 have been mounted in the system, a motor is turned on to rotate the spin head 30 and the end cap 20. When the end cap 20 has reached a suitable rotational speed, the drive mechanism for the ram 38 is actuated to move the ram 38 toward the spin head 30 until the end of the filter element 10 comes into light contact with the spinning end cap 20. Alternatively, contact between the end of the filter element 10 and the end cap 20 may be made before spinning is initiated. After contact is made, spinning is continued for a predetermined length of time, usually a fraction of a second. During this predetermined period of time, the end cap 20 and the filter element 10 spin relative to one another while both are positioned inside the cylindrical outer retainer 35. After this predetermined period of time, the clutch and brake assembly is actuated to disengage the spin head 30 from the motor and stop the rotation of the spin head 30. After a brief cooling interval, the ram 38 is withdrawn, carrying the filter element 10 and the end cap 20 with it. The fit between the pins 31a of the end cap adaptor 31 and the holes 24 in the top surface 21 of the end cap 20 should be loose enough that the when the ram 38 is retracted, the end cap 20 can be easily separated from the adaptor 31.

During spin welding, the sacrificial ridge 26 is preferably the first portion of the spinning end cap 20 to contact the filter element 10 and it contacts the end surface of the stationary core 12. The friction caused by the relative motion of the sacrificial ridge 26 and the core 12 causes at least part of the sacrificial ridge 26 to melt and form molten plastic. The molten plastic is spread outward from the sacrificial ridge 26 by centrifugal force and coats the confronting surfaces of the end cap 20 and the filter element 10. The sloped surface of the end cap 20 together with the outer retainer 35 and the inner retainer 32 prevent the molten plastic from escaping to the outside of the space between the end cap 20 and the filter element 10. Consequently, substantially all the molten plastic that is generated is used effectively in spin welding according to the present invention.

As the sacrificial ridge 26 and possibly the core 12 melt, the ram 38 continues to press the filter element 10 against the end cap 20, so the separation between the bottom surface of the end cap 20 and the end surface of the filter element 10 decreases and the two surfaces contact one another. Some melting of the bottom surface of the end cap 20 or the end surface of the filter pack 11 may take place when the bottom surface of the end cap 20 comes into frictional contact with the end surface of the filter pack 11 of the filter element 10. The amount of melting will depend on the length of time for which the end cap 20 is rotated while in contact with the filter pack 11 and on the angle of the bottom surface of the end cap. Preferably, however, most of the molten plastic used for connecting the end cap 20 to the filter element 10 comes from the sacrificial ridge 26 and the core 12. When the molten plastic solidifies, it securely joins the bottom surface 25 of the end cap 20 to both the core 12 and the end surface of the filter pack 11.

The relative rotational speed of the end cap 20 and the filter element 10 and the axial force with which the filter element 10 and the end cap 20 are pressed against each other during spin welding will depend on such factors as the materials of which the end cap and the filter element 10 are made, whether the filter pack 11 is corrugated or non-corrugated, and the melt flow index (i.e., a measure of viscosity) of the molten thermoplastic. In many instances the relative rotational velocity is preferably in the range from about 1500 to about 3000 rpm and the axial force is preferably in the range from about 10 to about 150 lbf. The pressure must be high enough to generate sufficient energy to melt the sacrificial ridge 26 but should not be so high as to crush the end of the filter element 10. The lower the melting point of the end cap 20 or the lower the viscosity of the molten material, the lower the axial force can be. A suitable velocity and axial force for spin welding a polypropylene end cap to a filter element 10 including a non-corrugated filter pack 11 made of polypropylene fiber and a polypropylene core 12 is about 1750 rpm and 80 lbf. The length of time for which the end cap 20 is rotated while in contact with the core 12 and the filter element 10 will also depend on the materials of which these members are made. Generally, it is in the range from about 0.1 to about 3 seconds.

It is not necessary to apply any external heat to the end cap 20 and the filter element 10 to produce the molten plastic for joining the two members. All necessary heat is generated by friction between the end cap 20 and the filter element 10.

During spin welding, frictional contact between the bottom surface of a rotating end cap and the end surface of a filter pack may cause some abrasion of the end surface of the filter pack. The abrasion will generally be insignificant in the case of a non-corrugated filter pack but will be greater with a corrugated filter pack having delicate pleats. If the abrasion is serious, it can effect the integrity of the seal between the filter pack and the filter element. The amount of abrasion can be reduced by compacting the pleats near the end of a corrugated filter pack prior to spin welding so as to increase the denseness of the end surface of the filter pack.

The densification of the end surface of a non-corrugated filter pack or a corrugated filter pack can be accomplished, for example, by making an inner diameter of the outer retainer 35 constant along the entire length of the retainer 35 but smaller than the nominal outer diameter of the filter pack 11, i.e., the outer diameter of the filter pack 11 when the filter pack 11 is in a relaxed state. Alternatively, the outer retainer 35 may have a larger inner diameter at the clamp end than the spin head end. In a preferred embodiment, the inner surface of the outer retainer 35 is generally conical, tapering by as much as 10 or 15 degrees or more from the clamp end toward the spin head end. The taper preferably ends just prior to the spin head end so the inner surface of the retainer 35 has a constant diameter from the end of the taper to the spin head end.

The filter element 10 may be inserted into the filter element clamp 34 and the outer retainer 35 with a twisting motion. For example, for a corrugated filter pack, the twisting causes the radially outer portions of the pleats of the filter pack 11 to be laid over or uniformly displaced in the circumferential direction with respect to the radially inner portions of the pleats, thereby decreasing the outer diameter of the filter pack 11 and increasing its denseness without crushing the pleats. Once the end cap 20 is inserted into the filter element holder 33, it is spin welded to the end surface of the filter element 10 with the pleats of the filter pack 11 in the laid over state. The end cap 20 and the end surface of the filter element 10 are preferably spun relative to one another while positioned within the constant inner diameter portion of the retainer 35. When the filter element 10 is removed from the filter element clamp 34 after spin welding, the pleats of the filter pack 11 in the portion adjoining the end cap 20 are maintained in the laid over state by the end cap 20, while the portions of the pleats farther away from the end cap 20 relax. Since the pleats remain laid over near the end caps 20, the filter element 10 has a smaller outer diameter near its end surfaces than at its longitudinal center. As a result, a corrugated filter pack having ends which have been compacted in this manner tapers towards its ends.

However, any method which can produce densification of a corrugated filter pack without producing a taper of the end surfaces can also be employed. For example, after spin welding the end cap 20 to the laid over pleats, the portions of the pleats further away from the end cap 20 may be maintained in the laid over state by a suitable sleeve, wrap, or cage. Alternatively, the corrugated filter element 10 may be inserted in the sleeve, wrap, or cage before the filter pack is inserted in the holder 33.

Figure 4:
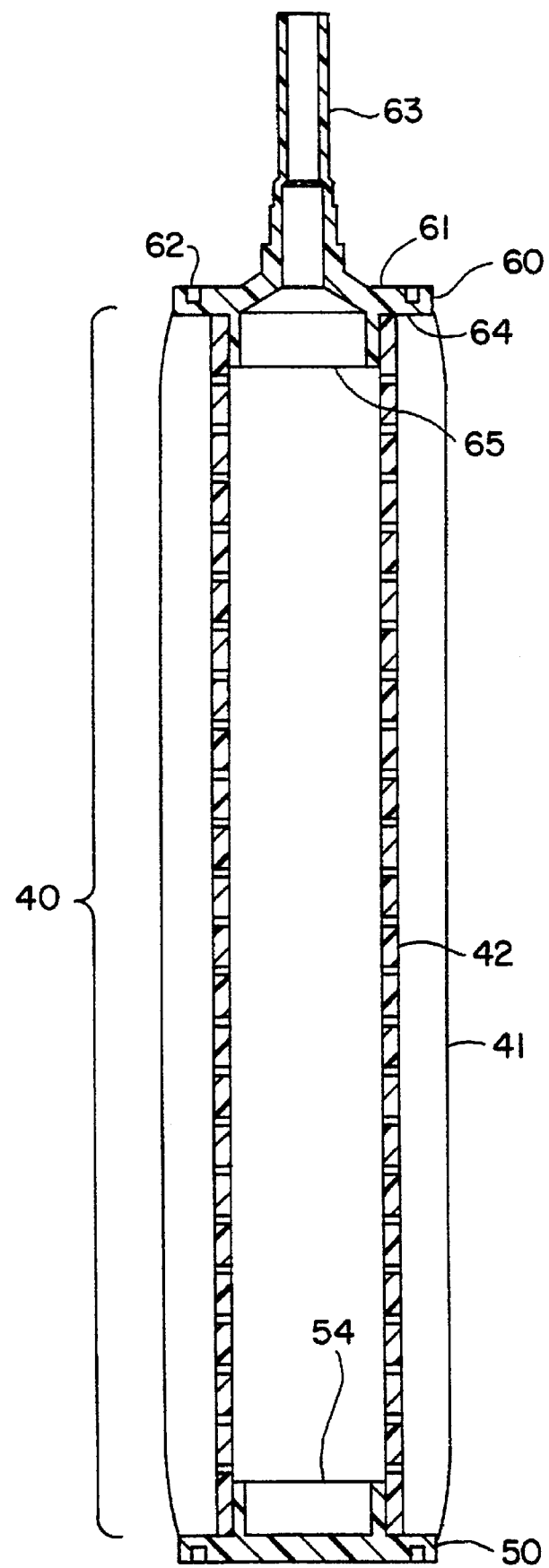
FIG. 4 is a longitudinal cross-sectional view of another embodiment of a filter assembly according to the present invention.

FIG. 4 is a longitudinal cross-sectional view of another embodiment of a filter assembly with spin welded end caps according to the present invention. The overall structure of this embodiment is similar to that of the embodiment of FIG. 1. Like the embodiment of FIG. 1, it comprises a filter element 40 and two end caps attached to opposite ends of the filter element 40. The filter element 40 includes a filter pack 41 and a perforated filter core 42 coaxially disposed inside the filter pack 41. The filter pack 41 is corrugated and has ends that have been compacted in the manner described above, resulting in the outer diameter of the filter pack 41 decreasing towards the ends. However, the filter pack 41 need not be corrugated, and the ends need not be tapered. A blind end cap 50 is secured to one end of the filter element 40, while an open end cap 60 is connected to the opposite end. The open end cap 60 is equipped with a connector 63 for connecting the filter element 40 to a housing, tubing, or the like, but the connector 63 is not an essential feature of the present invention. The most important difference between this embodiment and the embodiment of FIG. i is that each of the end caps of this embodiment includes a sleeve 54, 65 that extends into the core 42 of the filter element. 40.

Figure 5:
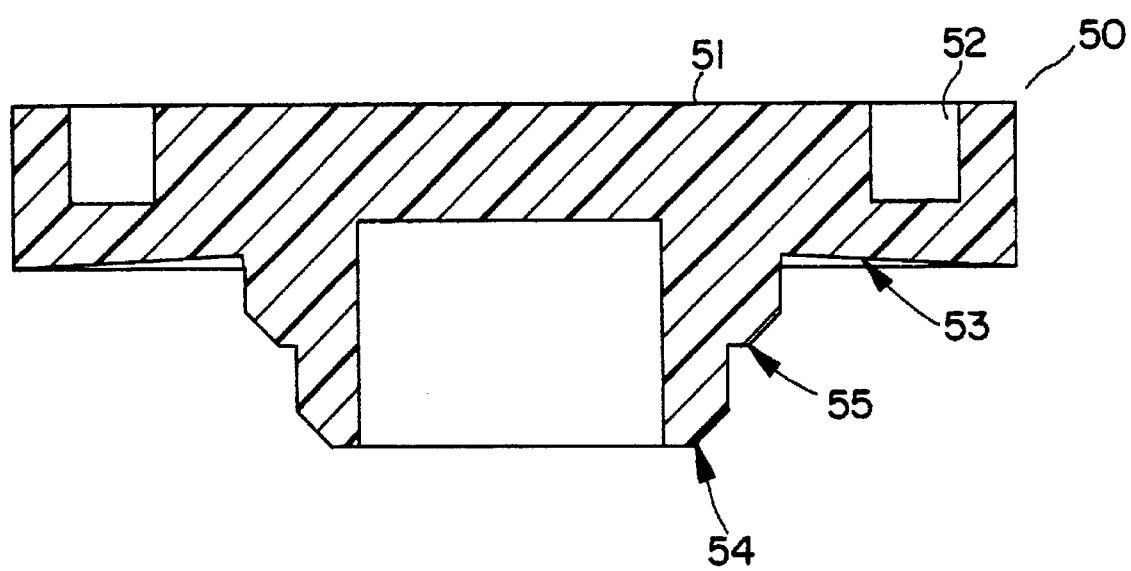
FIG. 5 is a cross-sectional view of the blind end cap of the filter assembly of FIG. 4.

FIG. 5 is a transverse cross-sectional view of the blind end cap 50 of FIG. 4. It has a base with a top surface 51 and a bottom surface 53. A plurality of holes 52, corresponding to holes 24 of FIG. 2A, are formed in the top surface 51 for receiving pins of a spin head of a spin welding system. The bottom surface 53 of the end cap is sloped, as in the embodiment of FIG. 2. The angle of the slope is chosen on the basis of the same factors as described with respect to the embodiment of FIG. 1.

A hollow sleeve 54 with a cylindrical outer surface projects from the bottom surface 53, and a sacrificial ridge 55 is formed around the outer periphery of the sleeve 54 near the connection between the sleeve 54 and the base of the end cap 50. The outer diameter of the sleeve 54 is preferably smaller than the inner diameter of the core 42 of the filter element 40 so that the sleeve 54 will not rub against the inner surface of the core 42 during spin welding. The inner diameter of the sleeve 54 is not critical, as long as the difference between the inner and outer diameters of the sleeve 54, i.e., the wall thickness of the sleeve 54, is adequate to prevent the sleeve 54 from being damaged during spin welding. Furthermore, the purpose of the hollow sleeve 54 on the blind end cap 50 could instead be served by a solid, rod-shaped member having the same outer dimensions as the sleeve 54 and projecting from the center of the bottom surface 53 of the end cap 50. However, a hollow sleeve 54 is preferable to a solid rod because of its lower weight.

The sacrificial ridge 55 serves the same purpose as the sacrificial ridge 26 of the embodiment of FIG. 2 and is at least partially melted during spin welding to generate molten plastic for joining the end cap 50 to the filter pack 41 and core 42. The sleeve 54 of the blind end cap 50, as well as the sleeve 65 of the open end cap 60, prevents molten plastic generated during spin welding from leaking into the cavity at the center of the filter element 40. The height of the sleeve 54 is preferably at least as great as the height of the sacrificial ridge 55 and is more preferably at least about 5% greater to reliably prevent leakage of molten plastic into the center cavity of the core 42.

The open end cap 60 comprises a base having a top surface 61 and a bottom surface 64. The connector 63 extends perpendicularly from the top surface 61, while the sleeve 65 extends perpendicularly from the bottom surface 64. Holes 62 for receiving pins of a spin head are formed in the top surface 61 around the connector 63. The connector 63 can be integral with the top surface 61 of the open end cap 60. However, an integral connector 63 makes it hard to perform spin welding of the end cap, since it is difficult to use the same spin head for a flat end cap as for an end cap with a connector attached to the top surface. Therefore, the connector 63 is preferably secured in any suitable manner to the top of the open end cap 60 after spin welding of the open end cap 60 to a filter element 40 has been completed. Like the blind end cap 50, prior to spin welding, the open end cap 60 has a sacrificial ridge formed around the sleeve 65. As the sacrificial ridge fuses with the filter core 42 during spin welding it is not visible in FIG. 4. The bottom surface 64 of the open end cap 60 is preferably sloped in the same manner as the bottom surface 53 of the blind end cap 50. Both end caps can be made of the same materials used for the end caps 20 of the first embodiment. The cavity at the center of the open end cap 60 decreases in diameter from the bottom surface 64 to the top surface 61 of the base, but alternatively, the diameter can remain constant or it can increase from one surface of the base to the other.

Figure 6:
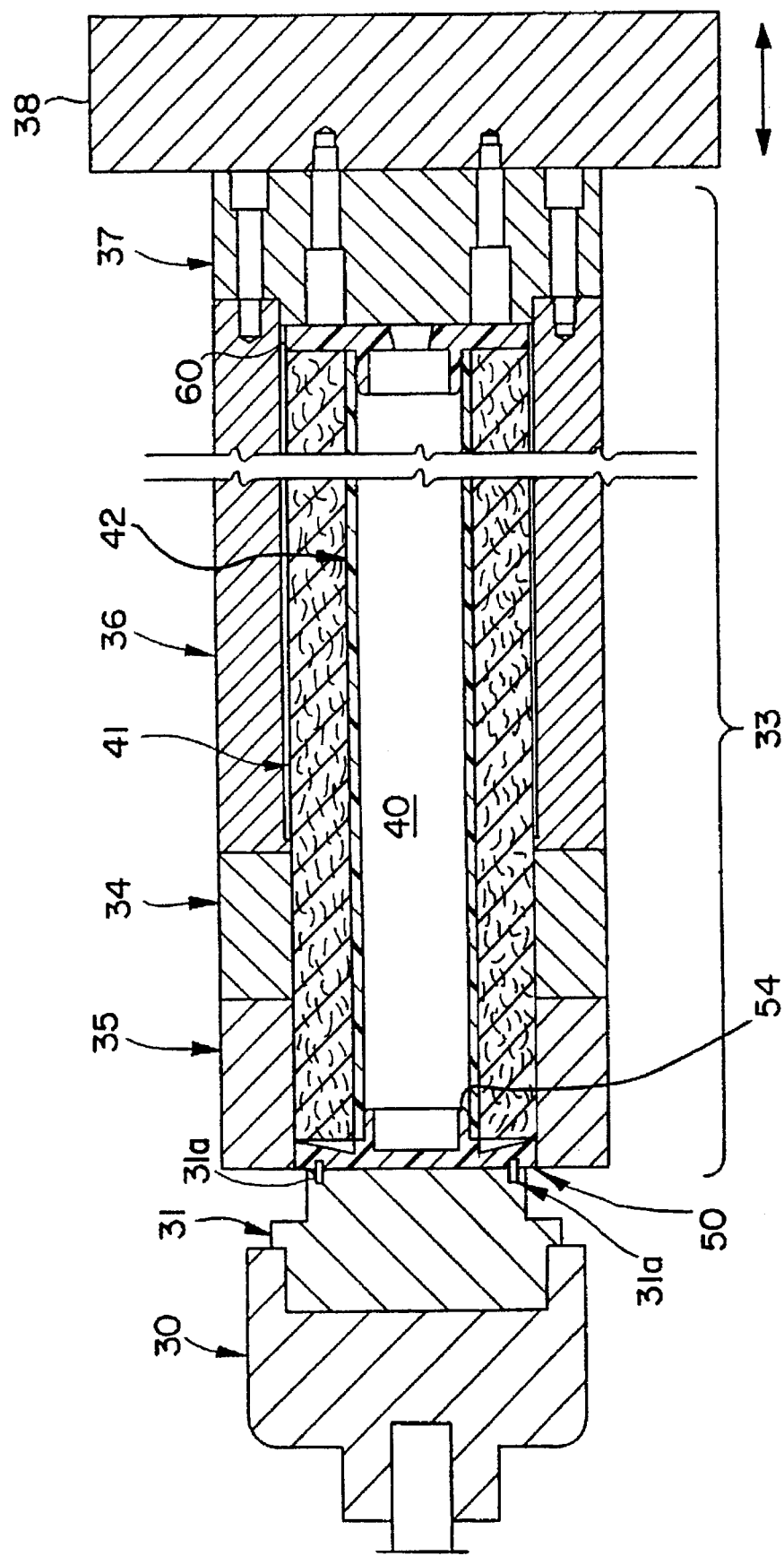
FIG. 6 is a longitudinal cross-sectional view of a portion of a spin welding system for manufacturing the filter assembly of FIG. 4 without the outlet connector.

FIG. 6 is a schematic longitudinal cross-sectional view of an embodiment of a spin welding system for use in manufacturing the embodiment of FIG. 4. This figure shows the state in which an open end cap 60 has already been spin welded to one end of a filter element and a blind end cap 50 is in the process of being spin welded to the opposite end. This system is identical in structure to the spin welding system of FIG. 3 except that the end cap adaptor 31 does not have an inner retainer. The sleeves 54,65 serve the same function as the inner retainer 32 of the spin welding system illustrated in FIG. 3 and make an inner retainer unnecessary. As in the embodiment of FIG. 3, the inner diameter of the outer retainer 35 is preferably larger than the outer diameter of the end caps 50 and 60 to prevent abrasion of the outer peripheral surfaces of the end caps.

Spin welding using the embodiment of FIG. 6 is performed in substantially the same manner as described with respect to the embodiment of FIG. 4. An end cap 50 is mounted on the end cap adaptor 31 of the spin head 30 by pins 31a, and a filter element 40 is mounted in the filter element clamp 34 of the filter element holder 33. A motor is turned on to rotate the spin head 30, and when the spin head 30 has reached a suitable speed, the ram 38 is actuated to bring the end surface of the filter element 40 towards the end cap 50 being held by the end cap adaptor 31. Alternatively, as stated previously, spinning may be initiated after contact of the two surfaces. As the filter element 40 approaches the spinning end cap 50, the sleeve 54 of the end cap 50 enters inside the filter core 42 of the filter element 40, and the sacrificial ridge 55 then comes into contact with the end surface of the core 42, causing the sacrificial ridge 55 and the core 42 to melt and generate molten plastic which coats the interface of the end cap 50 and the filter element 40. Once the end of the filter pack 41 contacts the surface of the end cap 50 some melting of these elements may also occur. The sleeve 54 of the end cap 50 prevents molten plastic from flowing along the inner surface of the core 42, while the outer retainer 35 prevents molten plastic from flowing along the outer surface of the filter element 40 or escaping to the outside of the system. Spinning is continued for a predetermined length of time while the ram 38 exerts a prescribed axial force on the end cap 50, and the clutch and brake assembly is then actuated to stop the rotation of the spin head 30. The molten plastic solidifies to join the end cap 50 securely to the end surface of the filter element 40. The open end cap 60 is spin welded to the filter element 40 in substantially the same manner as described above with respect to the blind end cap 50.

Figure 7A:
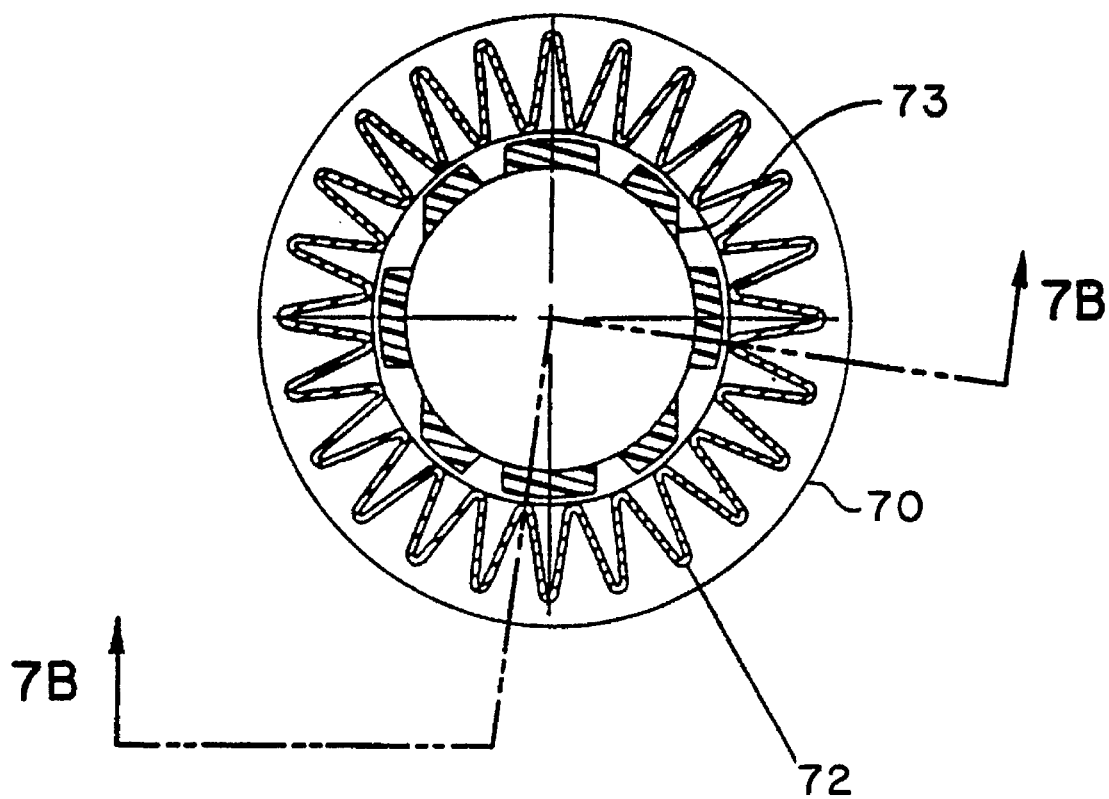
FIG. 7A is a transverse cross-sectional view of a conventional filter assembly having an end cap attached thereto by thermal welding.
Figure 7B:
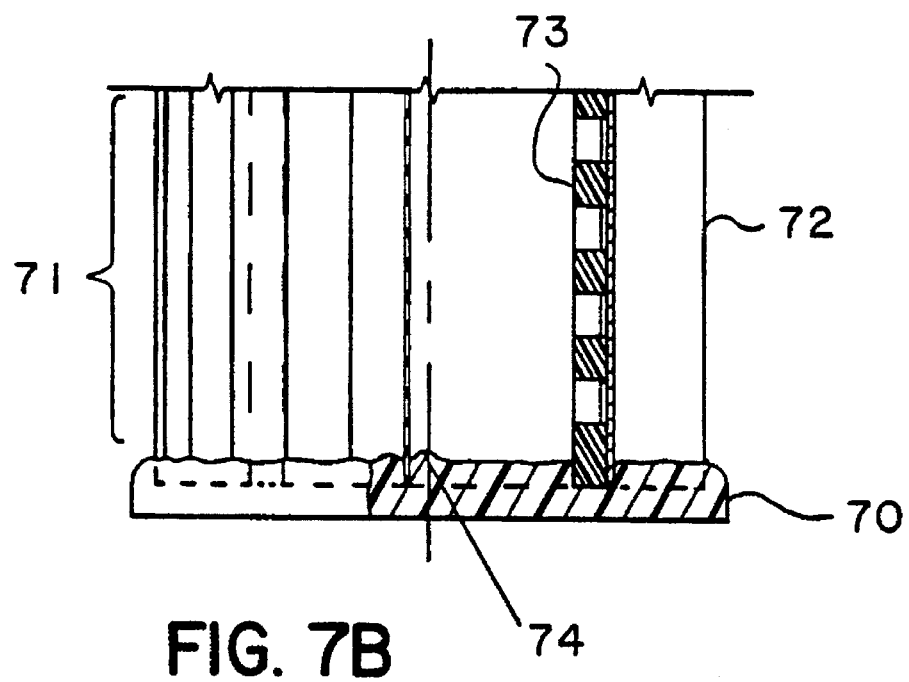
FIG. 7B is a vertical cross-sectional view taken along Line B—B of FIG. 7A.

FIGS. 7A and 7B are respectively a transverse cross-sectional view and a longitudinal cross-sectional view of a portion of a filter assembly having an end cap 70 connected to a filter element 71 by a conventional method such as thermal welding. In thermal welding, the end surface of the end cap 70 is melted by radiant or platen heating, for example and a large amount of molten plastic 74 is formed. When the filter element 71, which includes a filter pack 72 and a perforated core 73, is pressed against the molten surface of the end cap 70, the molten plastic 74 is drawn up the filter pack 72 of the filter element 71 by displacement and capillary action. If the filter pack 72 is initially hydrophilic, it can become hydrophobic at the interface with the molten plastic 74. While these hydrophobic regions may not impair the operation of the filter assembly, they make it troublesome to test the integrity of the filter assembly prior to use.

A common test for filter assemblies is the bubble point test, in which a filter element is saturated with a liquid such as water, and a gas pressure differential is then applied across the filter element. The pressure differential is then gradually raised and the pressure at which the first bubble appears outside the filter element is measured. At low pressures, the liquid in the filter element prevents gas from passing through the filter element except by diffusion through the liquid, unless there is a defect in the filter element which allows the gas to flow through the filter element. When the pressure differential reaches a prescribed level, referred to as the bubble point, the liquid is forced out of the filter element and gas can flow freely through the filter element. At the start of a bubble point test, the filter element must be wet over its entire volume or the gas will pass through the unwetted portion of the filter element even at low pressures. It is possible to adequately wet a hydrophilic filter element for the purposes of a bubble point test simply by dipping it into water. However, if the end portions of the filter element become hydrophobic due to molten plastic from the end cap 70, end portions can remain unwetted causing an erroneous indication of a defect in the filter element. One solution to this problem is to wet the entire filter element with a liquid, such as a solvent, having a lower viscosity or a lower surface tension than water. But then the liquid must be thoroughly purged from the filter element and the filter element must be dried before it can be used. Thus, the hydrophobic regions greatly complicate the procedures for performing a bubble point test.

Figure 8A:
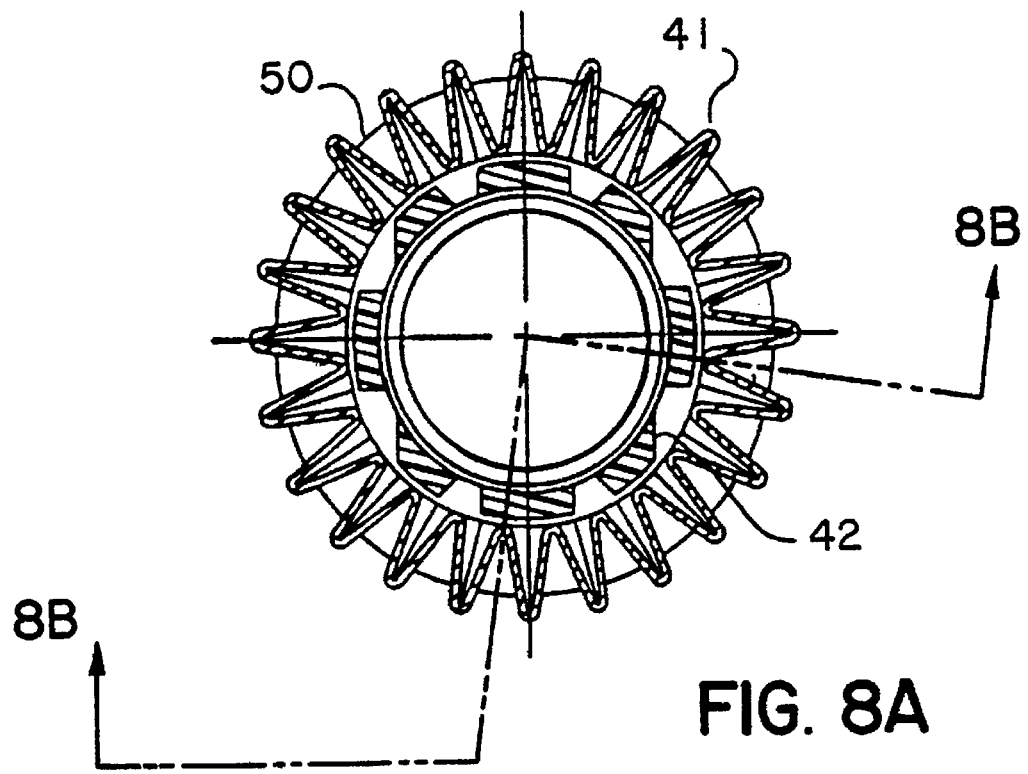
FIG. 8A is a transverse cross-sectional view of a filter assembly according to the present invention.
Figure 8B:
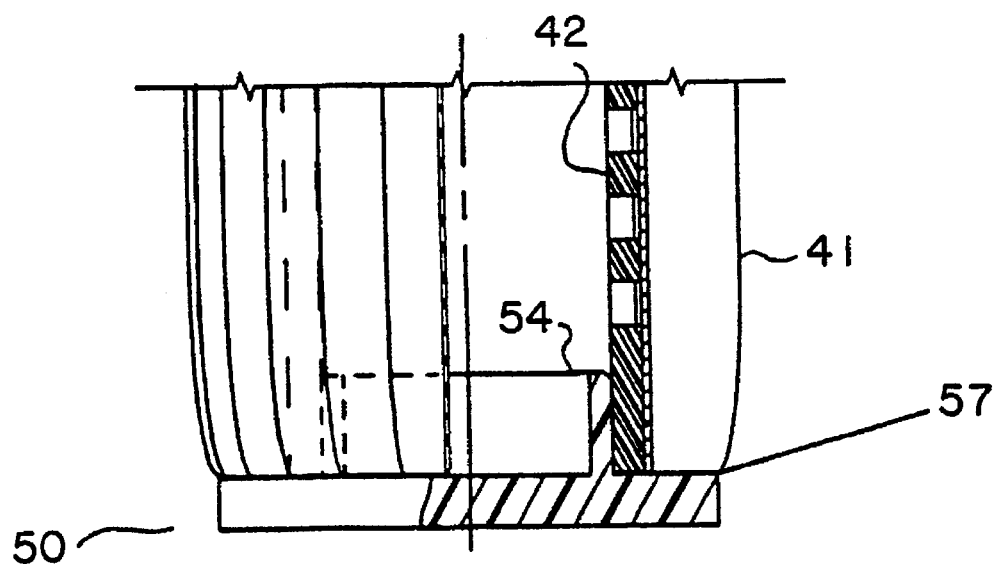
FIG. 8B is a vertical cross-sectional view taken along Line B—B of FIG. 8A.

For comparison, FIGS. 8A and 8B respectively illustrate a transverse cross-sectional view and a longitudinal cross-sectional view taken along Line B—B of FIG. 8A of a portion of a filter assembly according to the present invention having a spin welded end cap 50. Only a very small amount of molten plastic 57 is generated during spin welding, so an insignificant amount of molten plastic 57 is drawn up the filter pack 41 by capillary action and there is almost no degradation of the wettability of the filter pack 41 due to molten plastic. As a result, a filter element of a filter assembly according to the present invention can be fully wetted, even at its end portions, for the purposes of a bubble point test by simply dipping it in water.

Figure 9:
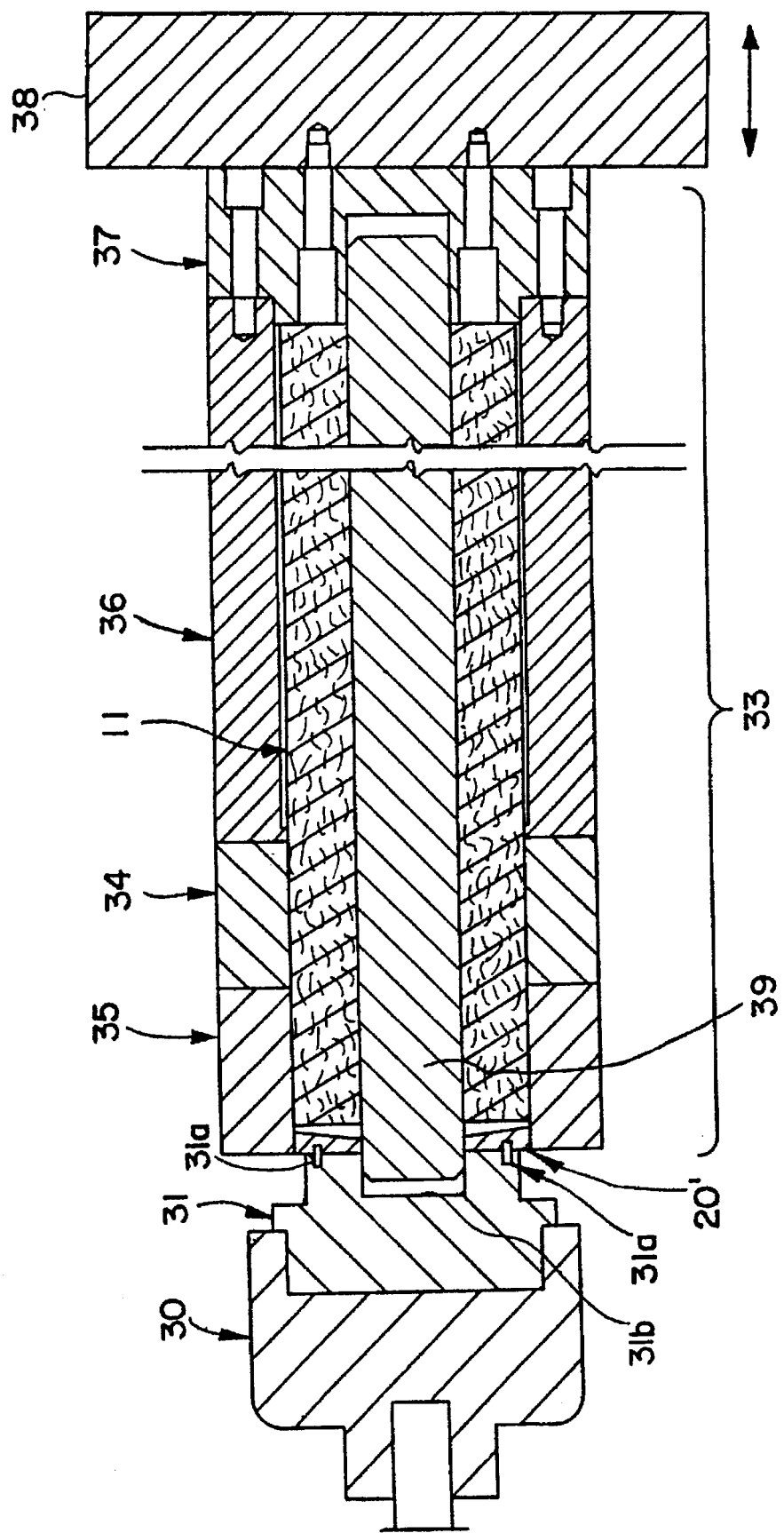
FIG. 9 is a longitudinal cross-sectional view of a portion of a spin welding system for connecting an end cap to a filter element without a core.

The embodiments of a filter assembly according to the present invention illustrated in FIGS. 1 and 4 are both equipped with a core, but as mentioned above, a filter assembly according to the present invention need not have a core. FIG. 9 schematically illustrates an embodiment of a spin welding system suitable for spin welding an end cap 20' to a filter element without a core. The filter element comprises a cylindrical filter pack 11, which may be corrugated or non-corrugated. The end cap 20' is nearly identical to the end cap 20 shown in FIG. 3 except it does not include a sacrificial ridge 26.

The spin welding system of FIG. 9 is nearly identical to the system of FIG. 3 except that the inner retainer 32 of FIG. 3 has been replaced by an inner retainer 39 extending through the entire length of the filter element. One end of the inner retainer 39 is secured to the filter element adaptor 37 of the filter element holder 33, while the other end projects beyond the end of the filter element 10 to which an end cap 20' is to be attached. Preferably, at least the outer surface of the end of the inner retainer 39 closer to the end cap 20' is made of or coated with a material, such as stainless steel, aluminum, PTFE, or PFA, which will not take part in spin welding. The inner diameter of the end cap 20' is preferably larger than the outer diameter of the inner retainer 39 to prevent friction between the two. The inner diameter of the filter pack 11 can be larger than the outer diameter of the inner retainer 39, but if there is a clearance between them, it should be small enough (on the order of 0.010 of an inch, for example) to prevent molten plastic from leaking between the inner retainer 39 and the filter pack 11. A recess 31b having a diameter larger than the diameter of the inner retainer 39 is formed in the end cap adaptor 31 to prevent interference between the adaptor 31 and the inner retainer 39 during spin welding. Spin welding using the system of FIG. 9 is performed in substantially the same manner as with the system of FIG. 3.

In the embodiment of FIG. 9, the inner retainer 39 extends all the way through the filter element in order to give it rigidity and prevent it from being deformed during spin welding. However, if the filter element without a core is sufficiently stiff, spin welding can be performed using the system of FIG. 3 having only a short inner retainer 32.

During use, a filter assembly according to the present invention is frequently disposed in a housing which confines the fluid being filtered and guides the fluid over the surface of the filter element. There are no particular restrictions on the type of housing in which a filter assembly according to the present invention can be disposed. However, because the outer diameter of the end caps of a filter assembly according to the present invention need be no greater than the outer diameter of the filter element of the filter assembly, the inner diameter of the filter housing can be reduced to the minimum value which can provide adequate fluid flow between the filter assembly and the housing and yet minimize the hold-up volume of the housing.

Figure 10:
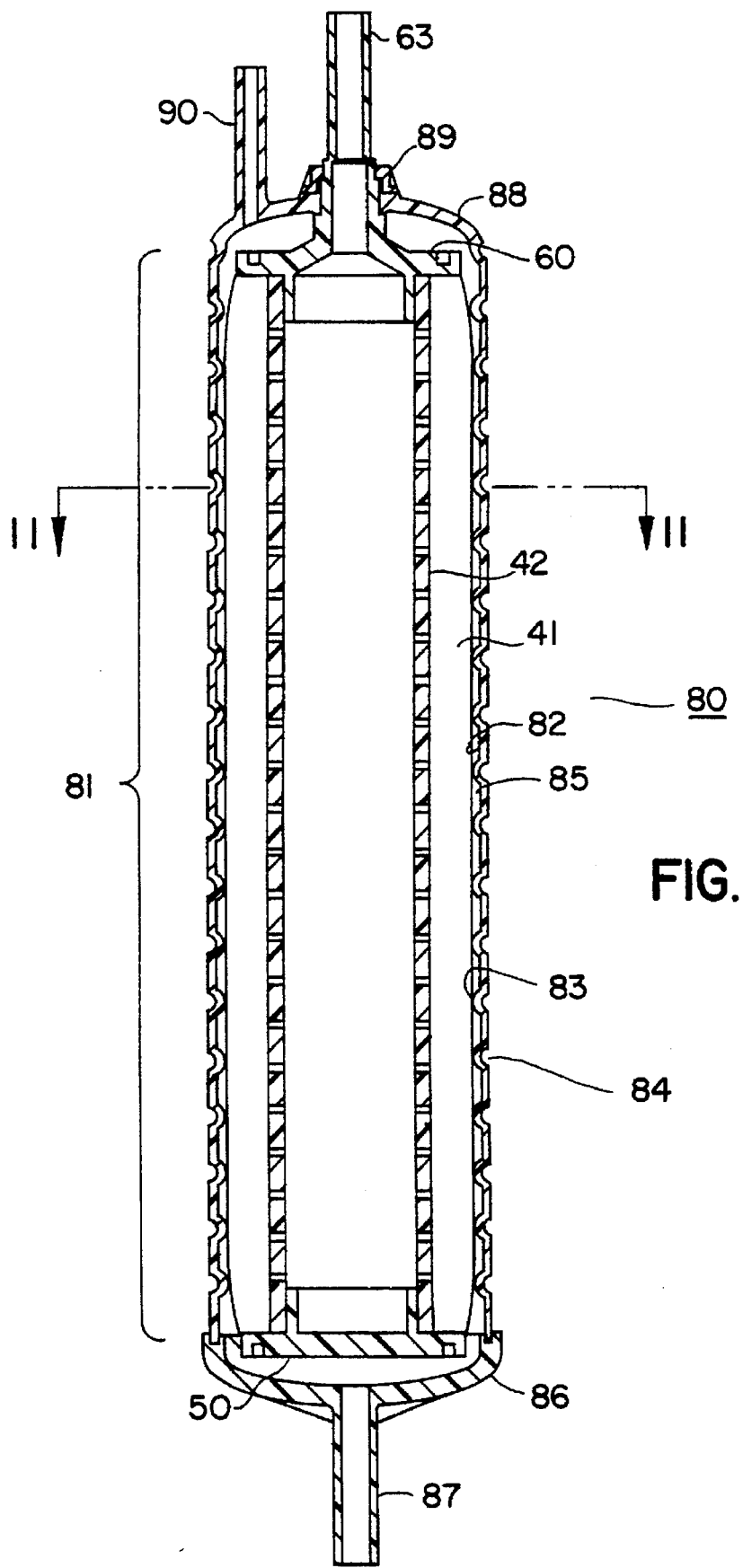
FIG. 10 is a vertical cross-sectional view of an embodiment of a filter arrangement including a filter housing according to the present invention.
Figure 11:
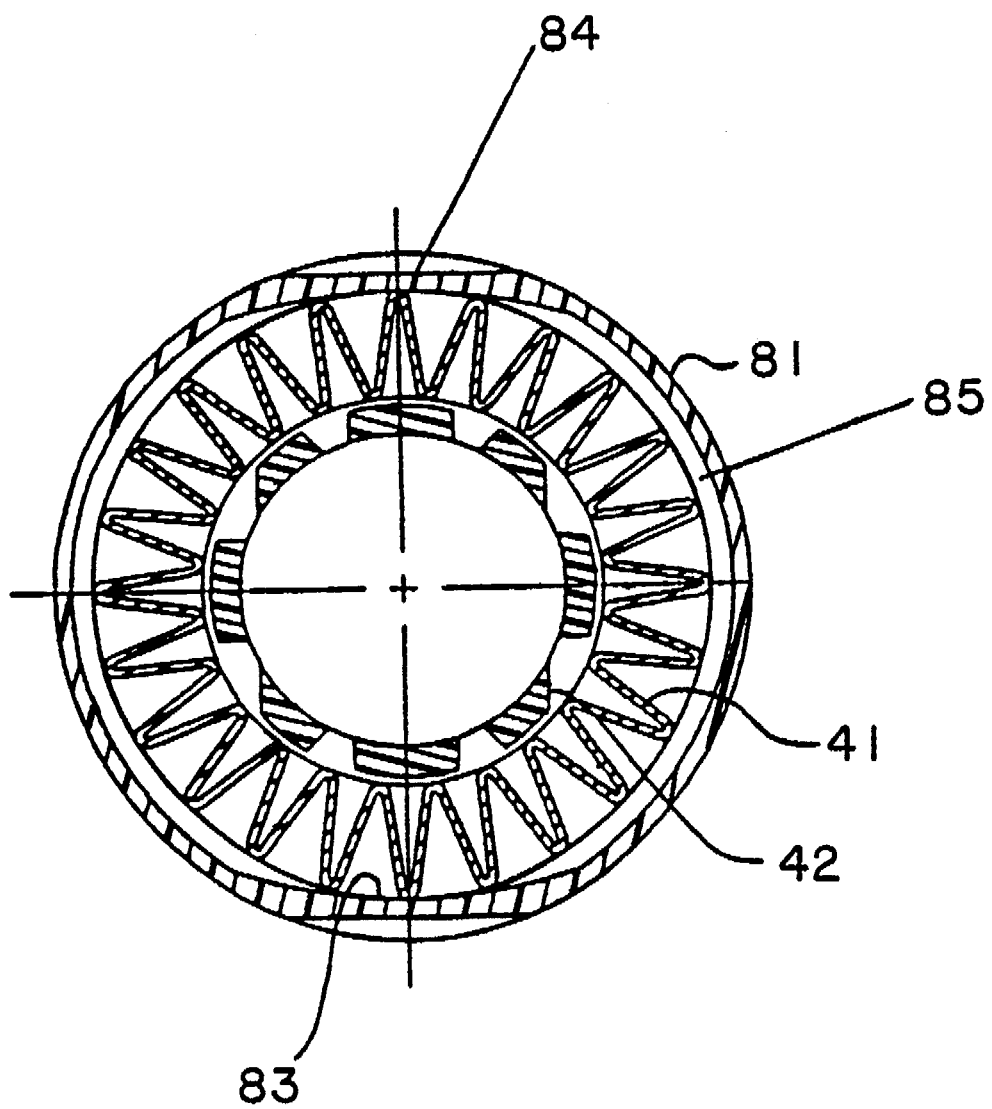
FIG. 11 is a transverse cross-sectional view taken along Line XI—XI of FIG. 10.

FIG. 10 is a longitudinal cross-sectional view of an embodiment of a filter housing 80 which is particularly suitable for use with a filter assembly according to the present invention, and FIG. 11 is a transverse cross-sectional view taken along Line XI—XI of FIG. 10. The filter housing 80 is illustrated as it appears when housing a filter assembly like the embodiment of FIG. 4. It has a cylindrical body 81, an inlet cap 86 secured to one end of the body 81, and an outlet cap 88 secured to the opposite end of the body 81. An inlet 87 for the fluid to be filtered is formed on the inlet cap 86, while the connector 63 of the filter assembly extends through the outlet cap 88 and serves as the outlet. An outlet seal 89 is shaped to receive the connector 63 of the filter assembly. A vent 90 is also formed in the outlet cap 88.

The body 81 of the filter housing 80 has a plurality of projections 83 which extend inward from the inner peripheral surface 82 of the body 81. When a filter assembly is inserted into the housing 80, the projections 83 contact or are in close proximity with the outer periphery of the filter element 40 of the filter assembly. The projections 83 may be formed in any manner which will allow fluid to flow from the inlet along the entire length of the filter element 40. In a preferred embodiment, the projections 83 are defined by the undersides of one or more helical grooves 86 formed along the outer surface of the housing body 81. When the grooves 84 are formed in the outer surface of the housing body 81, the inner surface is deformed inward, thereby creating the projections 83. The spaces between adjacent projections 83 define helical flow channels 85 which spiral helically along the length of the housing body 81. There is no restriction on the number of helical grooves 84. The body 81 may have a single helical groove 84, or a plurality of parallel helical grooves 84 which have the appearance of the threads of a multi-thread screw. In addition to defining the projections 83, the grooves 84 provide additional support to the housing 80 against the pressure of the fluid within the housing 80.

The height of the projections 83, i.e., the distance from their peaks to the inner peripheral surface 82 of the body 81, is not critical but preferably is the minimum height necessary to allow adequate fluid flow between the filter element 40 and the inner peripheral surface 82. Minimizing the height minimizes the hold-up volume of the housing 80. The minimum height will depend on the nature and the temperature of the fluid being filtered, the desired flow rate, and other factors and can be determined by one skilled in the art using well-known techniques.

The projections 83 support the filter pack 41 against reverse pressure excursions, i.e., situations in which the pressure on the inside of the filter element is greater than the external pressure. The projections 83 therefore serve the function of a cage for the filter element. The spacing between adjacent projections in the axial direction of the housing 80 will depend upon such factors as the reverse pressures that are likely to be encountered during use of the filter assembly and the structural integrity of the filter pack 41. The lower the reverse pressures, the less support is required by the filter pack 41, so the greater can be the spacing between projections.

The filter housing 80 can be made of any material which is compatible with the fluid being filtered and which can withstand the fluid pressure during filtering. For low pressure applications, the housing 80 can frequently be made of plastic. Blow molded plastic is particularly suitable for the housing 80 because helical grooves 84 can be easily formed in such a housing 80 at the time of blow molding. The grooves 84 can also be formed using other conventional techniques, such as injection molding or secondary thermal forming from sheet stock.

The projections 83 need not be helical, and as long as the projections can support the housing pressure and support the filter element against reverse pressures while permitting fluid to flow along the length of the filter element, there is no restriction on their shape. For example, when the filter pack 41 is non-corrugated, the projections can extend in the axial direction of the housing body 81. However, when the filter pack 41 is corrugated with longitudinal pleats, the projections preferably extend at an angle with respect to the axis of the housing body 81.

The grooves 84 themselves are not an essential feature of the housing body 81. A preferred embodiment includes grooves 84 because they are a convenient means of forming projections 83 in the inner peripheral surface 82 of the housing body 81 and because grooved cylinders have the greatest strength-to-weight ratio and, hence, are most efficient. However, if methods other than blow molding are used to manufacture the housing body 81, it is possible to form projections 83 on the inside of the housing body 81 without forming grooves in the outside of the housing body 81. For example, the housing body 81 can comprise two individually-molded sections which are joined together by bonding subsequent to molding, in which case each of the sections of the body 81 can have a smooth exterior surface.

After the formation of the housing body 81, the outlet cap 88 is joined to one end of the body 81 by any method which can attain a fluid-tight seal, such as by bonding. Alternatively, the outlet cap 88 may be formed integrally with the body 81 when the body 81 is formed. The filter assembly is then inserted into the housing body 81 with the connector 63 extending through the outlet seal 89. The connector 63 may then be sealed to the outlet cap 88 in any suitable manner, such as spin welding or thermal bonding. The inlet cap 86 is then joined to the other end of the housing body 81 in any suitable manner to seal the filter assembly inside the housing 80.

During use of the filter housing 80 illustrated in FIG. 10, a fluid, e.g., a liquid or a gas, to be filtered is introduced through the inlet 87 and then enters the helical flow passages 85 surrounding the filter element. The fluid spirals up the length of the filter element along the helical flow passages 85 and flows substantially radially through the filter element into the center of the perforated core 42. Once inside the core 42, the filtrate flows axially along the core 42 and as discharged through the connector 63 extending through the outlet seal 89. While the fluid is filling the housing 80, the vent 90 may be open. While filtration is being carried out, the vent 90 is closed off, so fluid can escape from the housing 80 only by flowing through the connector 63.

A filter arrangement employing a filter assembly and a filter housing 80 according to the present invention can be extremely light in weight, since the projections 83 of the filter housing 80 can support both the housing against the fluid pressure and the filter element against backpressure, so a separate filter cage is unnecessary. Furthermore, because the clearance between the inner peripheral surface 82 of the filter housing 80 and the outer peripheral surface of the filter pack 11 can be reduced to the minimum level required to provide adequate flow of fluid around the filter element, the hold-up volume of fluid in the filter housing 80 can be minimized. This attribute of the present invention is particularly advantageous when the filter housing 80 is used as part of a disposable filter arrangement which is discarded in its entirety after use, in which case all the hold-up volume is also discarded. In the electronics and pharmaceutical industries, the fluid being filtered is often expensive or hazardous, so a reduction in the hold-up volume can produce a significant decrease in costs.

A filter housing 80 according to the present invention is not restricted to use with a filter assembly having spin welded end caps. However, a filter assembly with spin welded end caps according to the present invention is particularly suited for use with a filter housing 80 according to the present invention. The end caps have an outer diameter which need be no larger than the outer diameter of the filter element and, therefore, can easily be inserted into a housing 80 where the projections 83 are dimensioned so as to contact the outer periphery of the filter element.

What is claimed is:

1. A spin welding system for connecting an end cap to an end of a filter element comprising:

an inner retainer having a cylindrical surface;

an outer retainer having a cylindrical surface and coaxially arrangeable with the inner retainer to define an annular space;

a filter element holder including a clamp for holding a filter element;

an end cap holder for holding an end cap in a position opposing an end of a filter element held by the clamp;

a device for producing relative rotational motion between the filter element holder and the end cap holder; and a mechanism for pressing an end cap held by the end cap holder against an end of a filter element held by the clamp in the annular space defined by the inner and outer retainers, the inner and outer retainers being dimensioned to retain molten material between an end cap and an end of a filter element.

2. The spin welding system of claim 1 wherein the inner retainer is secured to the end cap holder.

3. The spin welding system of claim 1 wherein the inner retainer is secured to the filter element holder.

4. A spin welding system for connecting an end cap to an end of a filter element comprising:

a filter element holder including an outer retainer having first and second ends and an inner surface, and a clamp for securing a filter element in the outer retainer such that an end of a filter element is spaced inwardly from the first end of the outer retainer;

an end cap holder for holding an end cap in a position opposing an end of a filter element held by the clamp;

a device for producing relative rotational motion between the filter element holder and the end cap holder; and a mechanism for pressing an end cap held by the end cap holder against an end of a filter element, and wherein the outer retainer allows an end cap to rotate relative to the outer retainer while retaining molten material between an end cap and an end of a filter element.

5. The spin welding system of claim 4 wherein the outer retainer is spaceable from a filter element.

6. The spin welding system of claim 4 wherein an inner diameter of the outer retainer is less than an outer diameter of a filter element thereby densifying a filter element in a region adjacent to a first end of a filter element.

7. The spin welding system of claim 6 wherein the inner diameter of the outer retainer varies and includes a first diameter at the second end of the outer retainer, a second diameter at the predetermined position, and a third diameter at the first end of the outer retainer, wherein the first diameter is larger than the second diameter.

8. The spin welding system of claim 7 wherein the third diameter is equal to or larger than the second diameter.

9. The spin welding system of claim 7 wherein the inner surface of the outer retainer between the second end and the predetermined position is tapered at an angle of at least 10 degrees.

10. The spin welding system of claim 4 wherein the relative motion producing device includes a clutch and brake assembly which stops the rotation after a predetermined time.

11. The spin welding system of claim 4 including means to provide a momentary cooling period prior to removing an end cap and a filter element after spin welding.

12. The spin welding system of claim 4 including an inner retainer having a cylindrical surface and disposable within a filter element for retaining flash.

13. The spin welding system of claim 12 wherein the inner retainer is secured to the end cap holder.

14. The spin welding system of claim 12 wherein the inner retainer is secured to the filter element holder.

15. The spin welding system of claim 12 wherein the inner retainer extends completely through the a filter element for providing rigidity to a filter element during rotation and pressing.

16. A spin welding system for connecting an end cap to an end of a filter element comprising:

a filter element holder including a clamp for holding and positioning a filter element;

an end cap holder for holding an end cap in a position opposing an end of a filter element held by the clamp, the end cap holder including an inner retainer sizeable to fit through an opening in an end cap and extendable beyond an end cap into a filter element;

a device for producing relative rotational motion between the filter element holder and the end cap holder; and a mechanism for pressing an end cap held by the end cap holder against an end of a filter element held by the clamp, and wherein the inner retainer is spaceable from a filter element a distance that allows the inner retainer to rotate relative to a filter element while retaining flash.

17. The spin welding system of claim 16 wherein the inner retainer is secured to the end cap holder.

18. The spin welding system of claim 16 wherein the inner retainer is secured to the filter element holder.

19. The spin welding system according to claim 1, wherein the inner retainer and the end cap holder comprise a single integral member.

20. The spin welding system according to claim 1, wherein the inner retainer and the end cap holder comprise joinable separate members.

21. The spin welding system according to claim 1, wherein the inner retainer is spaced from an inner region of a filter element during spin welding a distance to impede a flow of molten material generated during spin welding.

22. The spin welding system according to claim 21, wherein the distance is about 0.01 inch.

23. The spin welding system according to claim 1, wherein the cylindrical surface of the inner retainer does not melt during spin welding.

24. The spin welding system according to claim 23, wherein the cylindrical surface comprises stainless steel.

25. The spin welding system according to claim 23, wherein the cylindrical surface comprises aluminum.

26. The spin welding system according to claim 23, wherein the cylindrical surface comprises polytetrafluroethelene.

27. The spin welding system according to claim 23, wherein the cylindrical surface comprises perfluoroalkoxy.

28. The spin welding system according to claim 1, wherein the outer retainer and the clamp comprise a single integral member.

29. The spin welding system according to claim 1, wherein the outer retainer and the clamp comprise joinable separate members having differing coefficients of friction.

30. The spin welding system according to claim 1, wherein the outer retainer surrounds a portion of and extends past an end of a filter to impede a flow of molten material generated during spin welding.

31. The spin welding system according to claim 1, wherein the outer retainer comprises an inner diameter greater than an outer diameter of an end cap.

32. The spin welding system according to claim 1, wherein the cylindrical surface of the outer retainer is spaced from a filter element.

33. The spin welding system according to claim 1, wherein the cylindrical surface of the outer retainer contacts a filter element.

34. The spin welding system according to claim 1, wherein the cylindrical surface of the outer retainer has a substantially conical configuration for densifying an end of a filter element.

35. The spin welding system according to claim 1, wherein the outer retainer is spaced from an end cap a distance to impede a flow of molten material generated during spin welding.

36. The spin welding system according to claim 35, wherein the distance is about 0.01 inch.

37. The spin welding system according to claim 1, wherein the cylindrical surface of the outer retainer does not melt during spin welding.

38. The spin welding system according to claim 37, wherein the cylindrical surface comprises stainless steel.

39. The spin welding system according to claim 37, wherein the cylindrical surface comprises aluminum.

40. The spin welding system according to claim 37, wherein the cylindrical surface comprises polytetrafluoroethylene.

41. The spin welding system according to claim 37, wherein the cylindrical surface comprises perfluoroalkoxy.

42. The spin welding system according to claim 1, further comprising a connector sleeve and a filter element adapter, wherein the filter element adapter closes off an end of the filter element holder and is coupled to the pressing mechanism and the connector sleeve transmits axial and torsional forces to the clamp from the filter element adapter.

43. The spin welding system according to claim 1, wherein the filter element holder remains stationary during spin welding.

44. The spin welding system according to claim 1, wherein the end cap holder rotates during spin welding.

45. The spin welding system according to claim 1, wherein the end cap holder comprises a spin head coupled to the device for producing relative rotational motion and an end cap adapter for supporting an end cap.

46. The spin welding system according to claim 1, wherein the device for producing relative rotational motion is operable to produce relative rotation in the range from about 1500 to about 3000 rpm.

47. The spin welding system according to claim 1, wherein the pressing mechanism causes contact between an end cap and an end of a filter element for a time in the range of 0.1 to about 3 seconds.

48. The spin welding system according to claim 1, wherein the inner retainer is spaced from an inner region of a filter element during spin welding a distance to impede a flow of molten material generated during spin welding and the cylindrical surface does not melt during spin welding, and wherein the outer retainer surrounds a portion of and extends past an end of a filter element and is spaced from an end cap a distance to impede a flow of molten material generated during spin welding, the cylindrical surface of the outer retainer does not melt during spin welding.

49. The spin welding system according to claim 48, wherein the device for producing relative rotational motion is operable to produce relative rotation in the range from about 1500 to about 3000 rpm, the filter element remaining stationary and the end cap holder rotating, and wherein the pressing mechanism causes contact between an end cap and an end of a filter element for a time in the range of about 0.1 to about 3 seconds.

50. The spin welding system according to claim 49, wherein the outer retainer and the clamp comprise a single integral member and wherein the inner retainer and the end cap holder comprise joinable separate members.

51. A spin welding system for connecting an end cap to an end of a filter element comprising:

a filter element holder including a clamp for holding and positioning a filter element;

an end cap holder for holding an end cap in a position opposing an end of a filter element held by the clamp;

a device for producing relative rotational motion between the filter element holder and the end cap holder;

a mechanism for pressing an end cap held by the end cap holder against an end of a filter element held by the clamp; and a flash retaining element spaceable from an end cap and a filter element, the flash retaining element allowing relative rotation between at least one of an end cap and a filter element while containing flash.

52. The spin welding system according to claim 4, wherein the outer retainer has an inner diameter greater than an outer diameter of an end cap and the inner surface does not melt during spin welding.

53. The spin welding system according to claim 52, wherein the inner surface comprises aluminum.

54. The spin welding system according to claim 53, wherein the device for producing relative rotational motion is operable to produce relative motion in the range from about 1500 to about 3000 rpm, the filter element holder remaining stationary and the end cap holder rotating, and wherein the pressing mechanism causes contact between an end cap and an end of a filter element for a time in the range of about 0.1 to about 3 seconds.

55. The spin welding system according to claim 54, further comprising a connector sleeve and a filter element adapter, wherein the filter element adapter closes off an end of the filter element holder and is coupled to the pressing mechanism and the connector sleeve transmits axial and torsional forces to the clamp from the filter element adapter, and wherein the end cap holder comprises a spin head coupled to the device for producing relative rotational motion and an end cap adapter for supporting an end cap.

56. The spin welding system according to claim 55, wherein the outer retainer and the clamp comprise a single integral member.

57. The spin welding system according to claim 55, wherein the outer retainer and the clamp comprise joinable separate members having differing coefficients of friction.

58. The spin welding system according to claim 12, wherein the surface of the inner retainer does not melt during spin welding.

59. The spin welding system according to claim 58, wherein the surface comprises aluminum.

60. The spin welding system according to claim 16, wherein the inner retainer and the end cap holder comprise a single integral member.

61. The spin welding system according to claim 16, wherein the inner retainer and the end cap holder comprise joinable separate members.

62. The spin welding system according to claim 16, wherein the inner retainer comprises an outer surface that does not melt during spin welding.

63. The spin welding system according to claim 62, wherein the outer surface comprises aluminum.

64. The spin welding system according to claim 63, wherein the device for producing relative rotational motion is operable to produce relative motion in the range from about 1500 to about 3000 rpm, the filter element holder remaining stationary and the end cap holder rotating, and wherein the pressing mechanism causes contact between an end cap and an end of a filter element for a time in the range of about 0.1 to about 3 seconds.

* * * * *